(12) United States Patent
Otake et al.

(10) Patent No.: US 6,985,196 B2
(45) Date of Patent: *Jan. 10, 2006

(54) MASK FOR MANUFACTURING A SUBSTRATE WITH LIGHT REFLECTING FILM HAVING RANDOM LIGHT TRANSMITTING PARTS AND NON-LIGHT TRANSMITTING PARTS

(75) Inventors: Toshihiro Otake, Okaya (JP); Mutsumi Matsuo, Misato-mura (JP); Tadashi Tsuyuki, Okaya (JP)

(73) Assignee: Seiko Epson Corporation, (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/410,581

(22) Filed: Apr. 9, 2003

(65) Prior Publication Data

US 2003/0210484 A1 Nov. 13, 2003

(30) Foreign Application Priority Data

Apr. 10, 2002 (JP) .............................. 2002-108528

(51) Int. Cl.
*G02F 1/1335* (2006.01)

(52) U.S. Cl. ...................................... 349/113; 349/187
(58) Field of Classification Search ................ 349/113, 349/187

See application file for complete search history.

(56) References Cited

U.S. PATENT DOCUMENTS

| | | | |
|---|---|---|---|
| 5,408,345 A * | 4/1995 | Mitsui et al. .................. 349/42 |
| 5,453,855 A * | 9/1995 | Nakamura et al. ............. 349/58 |
| 5,724,111 A * | 3/1998 | Mizobata et al. ........... 349/112 |
| 5,940,154 A | 8/1999 | Ukita et al. | |
| 6,104,460 A | 8/2000 | Abe et al. | |
| 6,313,895 B1 * | 11/2001 | Tsuda et al. ................. 349/113 |
| 6,665,030 B2 * | 12/2003 | Hanazawa et al. .......... 349/113 |
| 6,747,718 B2 * | 6/2004 | Kanou et al. ................ 349/113 |
| 6,784,957 B2 | 8/2004 | Kanou et al. | |
| 2002/0041350 A1 | 4/2002 | Yamazaki et al. | |
| 2003/0103178 A1 | 6/2003 | Sakamoto et al. | |
| 2003/0218698 A1 * | 11/2003 | Otake et al. .................. 349/42 |

FOREIGN PATENT DOCUMENTS

| | | |
|---|---|---|
| EP | 1 156 359 | 11/2001 |
| JP | 05-323371 | 12/1993 |
| JP | 08-95071 | 4/1996 |
| JP | 11-237623 | 8/1999 |
| JP | 11-242217 | 9/1999 |
| JP | 11-281972 | 10/1999 |
| JP | 11-337964 | 10/1999 |
| JP | 2000-075132 | 3/2000 |

(Continued)

OTHER PUBLICATIONS

Communication from Chinese Patent Office re: counterpart application.

(Continued)

*Primary Examiner*—Andrew Schechter
(74) *Attorney, Agent, or Firm*—Harness, Dickey & Pierce, P.L.C.

(57) ABSTRACT

A light reflecting film is formed such that a plurality of concave portions or convex portions formed on a base are aligned randomly over a plane by using a mask in which the positions of light-transmitting parts or non-light-transmitting parts are allocated according to a random function, and the light-transmitting parts or non-light-transmitting parts are aligned randomly over a plane.

20 Claims, 22 Drawing Sheets

FOREIGN PATENT DOCUMENTS

| | | |
|---|---|---|
| JP | 2000-180833 | 6/2000 |
| JP | 2000-284272 | 10/2000 |
| JP | 2000-189542 | 11/2000 |
| JP | 2001-005015 | 1/2001 |
| JP | 2001-154371 | 6/2001 |
| JP | 2001-194662 A | 7/2001 |
| JP | 2001-201742 A | 7/2001 |
| JP | 2001-290169 | 10/2001 |
| JP | 2002-14211 | 1/2002 |
| JP | 2002-072184 | 3/2002 |
| JP | 2002-72184 A | 3/2002 |
| JP | 2002-258278 | 9/2002 |
| JP | 2003-149662 A | 5/2003 |
| WO | WO 01/38932 | 5/2001 |

OTHER PUBLICATIONS

Communication from Korean Patent Office re: counterpart application, no translation.

Communication from Japanese Patent Office re: counterpart application.

Communications from Japanese and Taiwanese Patent Office re: related applications.

Communication from Japanese Patent Office re:related application.

Communication from Japanese Patent Office regarding related application.

* cited by examiner

FIG. 1
(a)
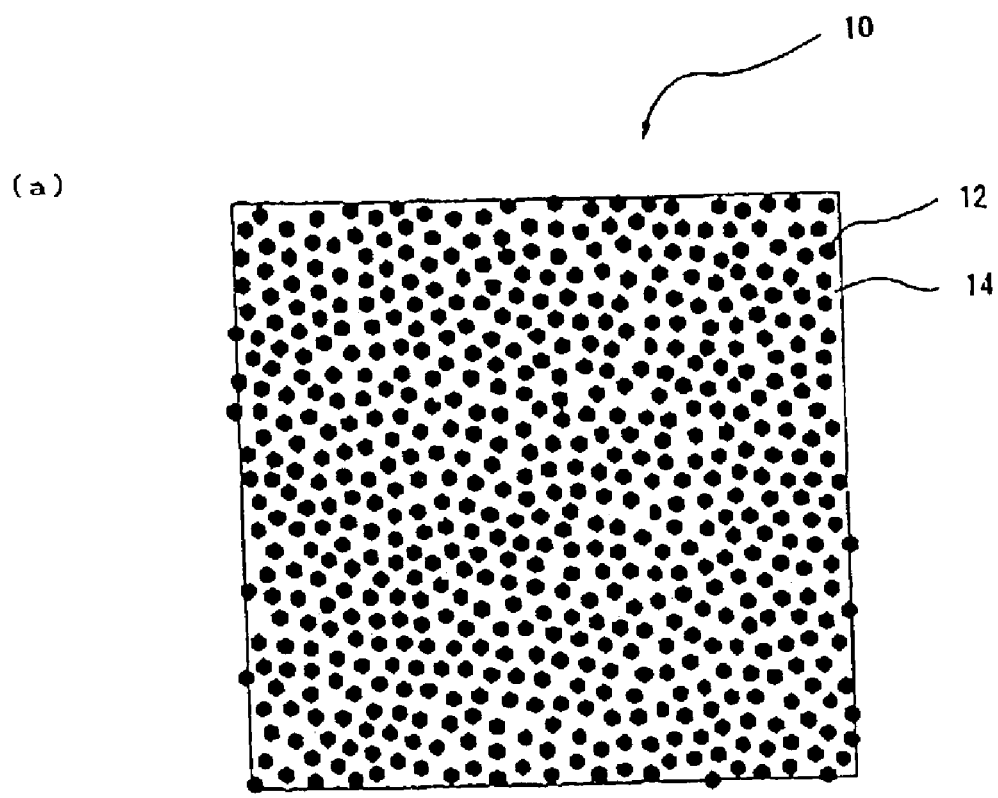
(b)
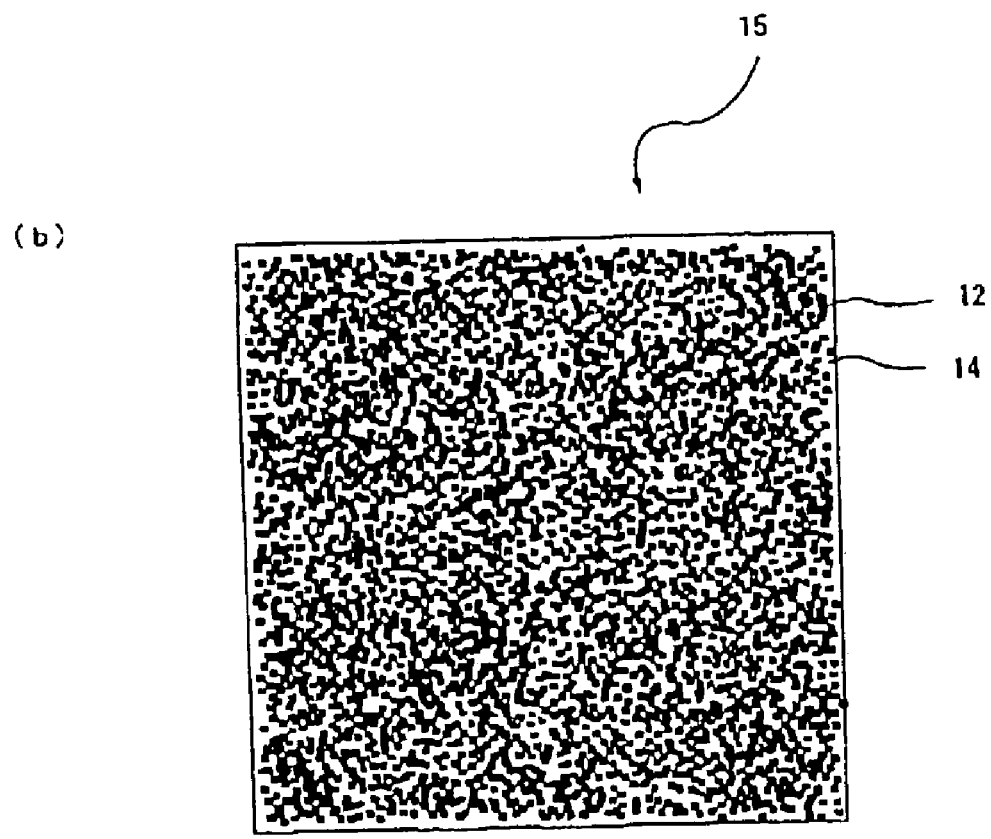

FIG. 9
(a)
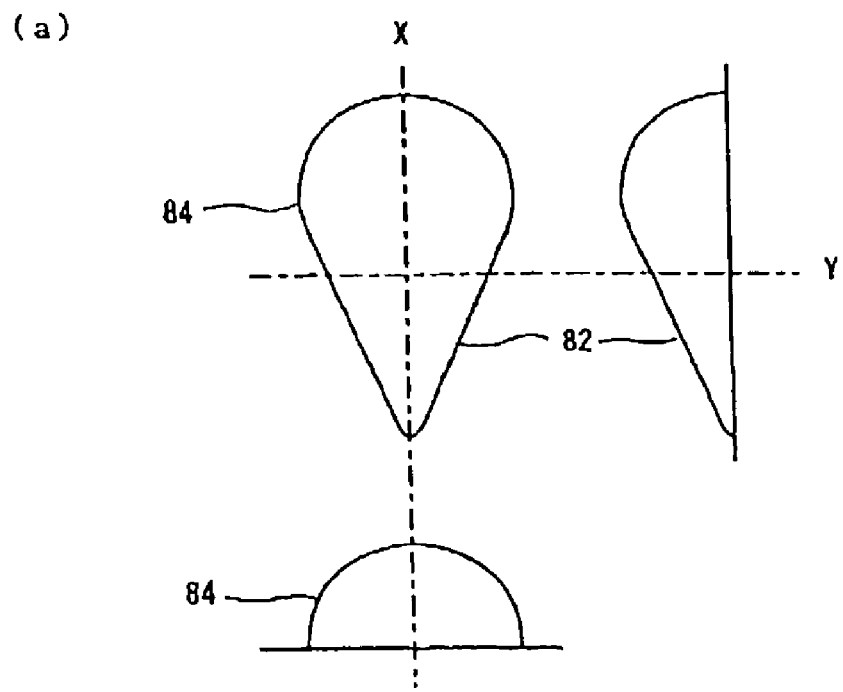
(b)
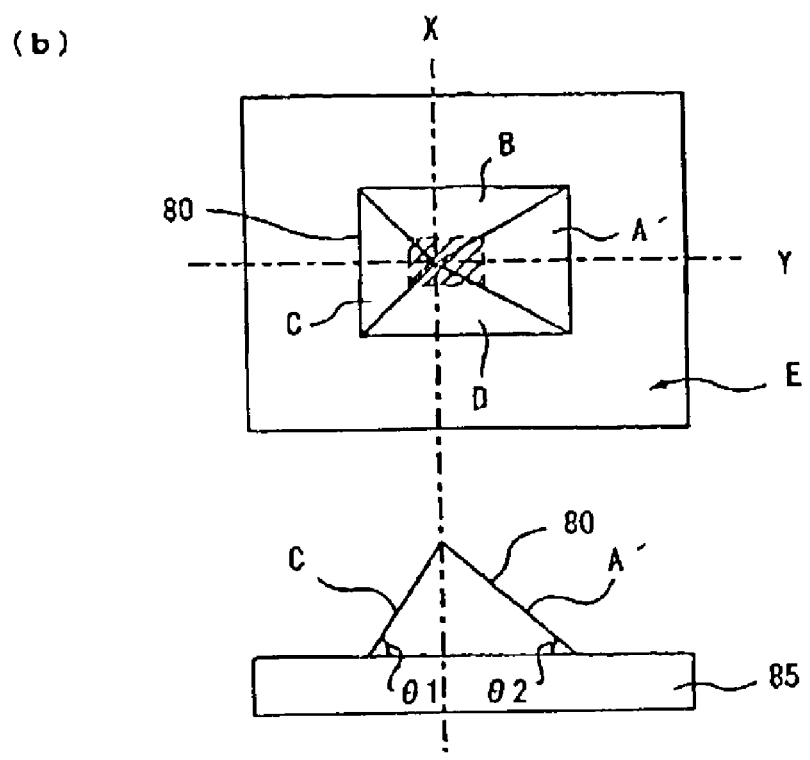

FIG. 29
PRIOR ART
(a)
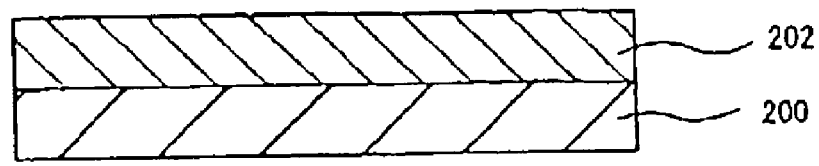
(b)
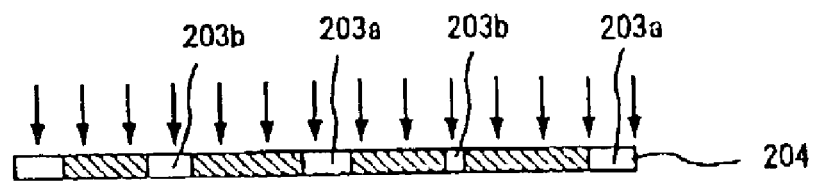
(c)
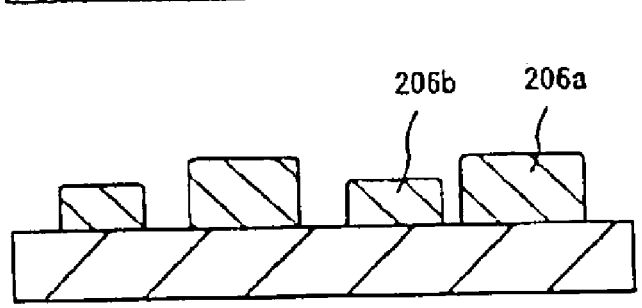
(d)
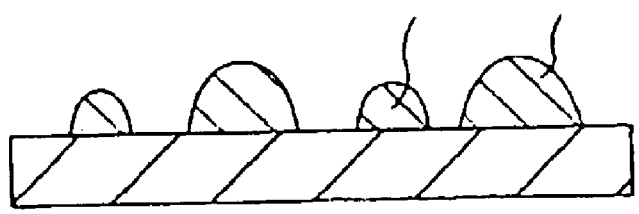
(e)
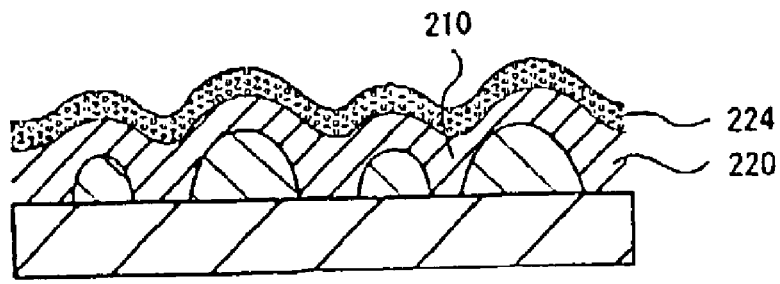

MASK FOR MANUFACTURING A SUBSTRATE WITH LIGHT REFLECTING FILM HAVING RANDOM LIGHT TRANSMITTING PARTS AND NON-LIGHT TRANSMITTING PARTS

BACKGROUND OF THE INVENTION

1. Technical Field of the Invention

The present invention relates to a mask, a substrate with a light reflecting film, a method for manufacturing a light reflecting film, an optical display device, and an electronic apparatus, and more specifically, it relates to a mask for manufacturing a substrate with a light reflecting film generating few interference fringes, a substrate with a light reflecting film formed by using the mask, a method for manufacturing a light reflecting film, an optical display device having a light reflecting film on which hardly any interference fringes are generated, and an electronic apparatus having a light reflecting film on which hardly any interference fringes are generated.

2. Related Art

As widely known, liquid crystal display devices are widely used as display devices in various electronic apparatuses because of their realization of reduced thickness and the low power consumption. Such a liquid crystal display devices normally have a configuration in which a liquid crystal is injected between a pair of glass substrates and the peripheral edges of the substrates are sealed by a sealant. An electronic apparatus having such a liquid crystal display device therein adopts a configuration in which a protective plate is provided on the viewing side of the liquid crystal display device, that is, on the side toward a viewer observing the display, in order to protect the liquid crystal display device against external impacts. The protective plate is a plate-shaped member which is normally made of a material having light transmittance characteristics, for example, transparent plastic, etc.

However, in such a protective plate, it is difficult to make its surface facing the liquid crystal display device completely smooth, and fine concave portions or convex portions exist on the surface in many cases. Therefore, in the case of providing such a protective plate on the liquid crystal display device, there are many problems such as great deterioration of the display quality due to the fine concave portions or convex portions on the surface.

One reason for the deterioration of the display quality is that the gap between the substrate at the viewing side and the protective plate in the liquid crystal display device is uneven due to the concave or convex portions existing on the surface of the protective plate. That is, interference occurs due to the unevenness of the gap when light coming from the liquid crystal display device passes through the protective plate, and as a result, interference fringes are generated. It is presumed that the display quality is deteriorated because the generated interference fringes and the display images are mixed.

A reflective liquid crystal display device 400 as shown in FIG. 27 is disclosed in Japanese Unexamined Patent Application Publication No. 6-27481; a hybrid reflecting/transmitting type 500 as shown in FIG. 28 is disclosed in Japanese Unexamined Patent Application Publication No. 11-281972, a plurality of concave or convex structures 404a, 404b (504a, 504b) having different heights from each other are provided to decrease the occurrence of interference fringes, high-molecular resin films 405 (505) are formed thereon, and continuous wave-shaped reflecting electrodes 409 (509) are formed thereon.

In addition, a manufacturing process of a liquid crystal display device having such a reflecting electrode is illustrated on FIG. 29, for example. First, as shown in FIG. 29(a), a photoresist film 602 is formed on the overall surface of a glass substrate 600, and then, as shown in FIG. 29(b), the photoresist film 602 is exposed through a pattern 604 being formed of a plurality of different-diameter circles. Then, as shown in FIG. 29(c), it is developed, and a plurality of concave or convex portions 606a, 606b, each having different heights and angles, are provided. Then, by heating the concave or convex portions and softening the angled portion of the concave or convex portions as shown in FIG. 29(d), the angle-removed concave or convex portions 608a, 608b are formed. As shown in FIG. 29(e), an amount of high-molecular resin 620 fills the space between the concave or convex structures 610 to make a continuous layer having the wave-shaped surface. In addition, a wave-shaped reflecting electrode 624 is formed on the high-molecular resin film 620 by using a stacking method such as a sputtering method or the like.

However, although the reflective liquid crystal display device or a hybrid reflecting/transmitting liquid crystal display device disclosed in Japanese Unexamined Patent Application Publication No. 6-27481 etc., employs a mask pattern on which a plurality of different-diameter circles, etc. are aligned uniformly or non-uniformly in part, and intends to provide a plurality of different-heights concave or convex structure by using a ultraviolet exposure and the development, it is difficult to adjust the height precisely to effectively prevent the light interference because of the unevenness of the coating thickness, or the like. In addition, since a reflecting electrode is formed on a plurality of different-heights concave or convex structures, there often occurs a breaking of wire or short-circuited phenomenon, too. In addition, the disclosed method for manufacturing a light reflecting film involves many processing steps and management items to be processed, which results in many problems in the manufacturing.

Therefore, according to the light reflecting films disclosed in Japanese Unexamined Patent Application Publication No. 6-27481 etc., it is difficult to manufacture such a light reflecting film stably and effectively, as well as to prevent the occurrence of interference fringes effectively.

Therefore, there is a method of forming a mask pattern having light-transmitting parts or non-light-transmitting parts aligned randomly, forming a light reflecting film by using that, and manufacturing a reflective liquid crystal display device or a hybrid reflecting/transmitting type liquid crystal display device having such a light reflecting film, but it is presumed that such a method also results in many problems as follows.

1. The random alignment design is complicated in the light-transmitting parts or non-light-transmitting parts, and the mask pattern design is not easy to make.

2. The degree of desirable random alignment in the light-transmitting parts or non-light-transmitting parts of the mask pattern is not assured.

3. The reproducibility of reflecting characteristics of the mask pattern in repeated designs is not assured.

In the meantime, with recent development of a big screen-sized display device such as a liquid crystal display device, etc., mass-production of the display devices having 30 to 40 inches of a display region is being developed, and a 60 inch wall-hanging type display device having 16:9 wide-display screen in aspect ratio is to be developed. In the case of the big-sized display device, there is increasingly required a light reflecting film having few interference fringes generated, while there is also required the easiness or rapidness of the mask pattern design in its manufacturing.

Therefore, as a result after the inventors of the present invention studied the above problems, they discovered that the design of the mask pattern can be easy by allocating the light-transmitting parts or non-light-transmitting parts by a random function, and by using the mask pattern having them randomly aligned over a plane, and furthermore, when it is employed in a liquid crystal display device, etc., the light reflecting film having few interference fringes generated can be achieved easily.

That is, the present invention provides a mask with easy design for achieving a substrate with a light reflecting film having few interference fringes generated when employed on a liquid crystal display device, a substrate with such a light reflecting film, a method for manufacturing such a light reflecting film, an optical display device having such a light reflecting film provided therein, and an electronic apparatus having such a light reflecting film.

SUMMARY

According to the present invention, there is provided a mask for manufacturing a substrate with a light reflecting film, wherein the positions of light-transmitting parts or non-light-transmitting parts are allocated according to a random function, and the light-transmitting parts or non-light-transmitting parts are aligned randomly over a plane to solve the above problems.

That is, by allocating the light-transmitting parts or non-light-transmitting parts by a random function, the mask can be easily designed in a short time even with a complicated random pattern, etc. In addition, a function to generate a number at random with mathematical probability is good as the random function to be used, and as described below, for example, it is good to generate a number of 0 to 1 by corresponding to RGB dots, and to correspond a mask pattern based on the number.

According to the mask of the present invention, in which the positions of the light-transmitting parts or non-light-transmitting parts are determined by a random function, and the light-transmitting parts or non-light-transmitting parts are aligned randomly over a plane, when manufacturing a substrate with a light reflecting film with the mask, the excellent light scattering effect is achieved with good reproducibility so as to effectively prevent the occurrence of interference fringes.

The reason to control the plane shape of the light-transmitting part or non-light-transmitting part is that there are positive-type and negative-type photosensitive resins forming a substrate with a light reflecting film. The positive-type is the type that the portion on which light is irradiated after being transmitted through the light-transmitting part is photolyzed and solubilized by a developing agent, and the negative-type is the type that the portion on which light is irradiated after being transmitted through the light-transmitting part is photosensitized and insolubilized by a developing agent.

Further, in forming the mask of the present invention, the light-transmitting parts or non-light-transmitting parts are preferably aligned randomly over a plane by generating a number of 0 to 1 by the random function, allocating a number of 1 to n (n is a natural number of 2 to 1000.) on all dots based on the number, and corresponding n types of random patterns prepared in advance to the allocated numbers.

As above, in allocating by a simple random function, a mask having preferable reflecting characteristics can be designed easily and in a short time. In addition, even though it is necessary to prepare n-types of random patterns in advance, the design itself is possibly made easily and in a short time with a random pattern for each small area, compared with the case without using a random function. In addition, by varying the n-types of random patterns properly, it is possible to search random patterns having preferable reflecting characteristics easily and in a short time.

Further, in forming the mask of the present invention, it is preferable to align light-transmitting parts or non-light-transmitting parts randomly over a plane with one unit of 100 to 2,000 RGB dots or an entire display screen, that is, by making the entire substrate with a reflecting film formed by the mask as one unit.

In the case of aligning the light-transmitting parts or non-light-transmitting parts randomly over a plane, and using the achieved light reflecting film on a liquid crystal display device, etc., there is sometimes found irregular stains, but if the random pattern with the above number of pixels as one unit is used, the generation of the irregular stains can be decreased effectively.

Further, in forming the mask of the present invention, it is preferable to form the light-transmitting parts or non-light-transmitting parts with a stripe-shaped random pattern in the horizontal direction or in the longitudinal direction, and to repeat the stripe-shaped random pattern in a plurality of rows.

By structuring as above, it is possible to design a random pattern having the reflecting characteristics, which is preferable on the whole by a small amount of information, easily and in a short time. In addition, since a unit of random patterns is repeated in the horizontal direction or in the longitudinal direction, the random pattern having preferable reflecting characteristics as a whole can be achieved with good reproducibility.

Further, in forming the mask of the present invention, it is preferable to form the diameter of the light-transmitting part or non-light-transmitting part as any value within the range of 3 to 15 $\mu$m.

By structuring as above, the light reflecting film having few interference fringes generated can be effectively fabricated. That is, when the light reflecting film is formed, and if a concave portion or convex portion has the diameter as above, the planar shape or allocation pattern can be controlled precisely by using an exposure process. Therefore, light can be stably scattered from the achieved light reflecting film so as to prevent the occurrence of interference fringes effectively.

Further, in forming the mask of the present invention, it is preferable to provide 2 to 10 types of light-transmitting parts or non-light-transmitting parts having different diameters.

By structuring as above, the light reflecting film having few interference fringes generated can be manufactured more effectively. That is, when manufacturing the light reflecting film, since there exist a plurality of concave portions or convex portions having different diameters, the alignment of the plurality of concave portions or convex portions can be formed more distributed. Therefore, since light can be properly scattered from the achieved light reflecting film so as to prevent the occurrence of interference fringes more effectively.

Further, in the case of varying the diameter of the light-transmitting part or non-light-transmitting part, it is preferable to make at least one diameter of a value over 5 μm. To the contrary, if all are circles or polygons having the diameter less than 5 μm, light can be often scattered excessively when manufacturing the light reflecting film, and as a result, the quantity of reflecting light by the light reflecting film may be greatly decreased.

Further, according to another aspect of the present invention, there is provided a substrate with a light reflecting film including a base and a reflecting layer, the positions of a plurality of concave portions or convex portions formed on the surface of the base are allocated according to a random function, and the plurality of concave portions or convex portions are aligned randomly over a plane.

By aligning the plurality of concave portions or convex portions randomly over a plane as above, the occurrence of interference fringes can be effectively prevented when used in a liquid crystal display device, etc.

Further, since the positions of the plurality of concave portions or convex portions are allocated according to a random function, the plane shape or allocation pattern of the concave portions or convex portions can be controlled precisely by exposure.

Further, in forming a light reflecting film of the present invention, it is preferable to align a plurality of concave portions or convex portions randomly over a plane with one unit of 100 to 2,000 RGB dots (1 pixel) or an entire display screen.

When using the light reflecting film having a random pattern on a liquid crystal display device, etc., there is sometimes found irregular stains, but if there is used a light reflecting film having the random pattern with the plurality of RGB dots as one unit as above, the generation of such irregular stains can be decreased effectively.

Further, in forming a substrate with a light reflecting film of the present invention, it is preferable to align a plurality of concave portions or convex portions randomly in the horizontal direction or in the longitudinal direction, and to repeat them in a plurality of rows.

By structuring as above, it is possible to form a substrate with a light reflecting film having the reflecting characteristics which is preferable on the whole, by a small amount of information. In addition, since a unit of the random patterns is repeated in the horizontal direction or in the longitudinal direction, the random pattern having preferable reflecting characteristics as a whole can be achieved with good reproducibility.

Further, in forming the substrate with a light reflecting film of the present invention, it is preferable to form the diameter of the plurality of concave portions or convex portions as any value within the range of 3 to 15 μm.

By structuring as above, since the plane shape or allocation pattern of the concave portions or convex portions can be controlled precisely by using an exposure process, and additionally, light can be scattered properly, the occurrence of interference fringes can be prevented effectively.

Further, in forming the substrate with a light reflecting film of the present invention, it is preferable to install 2 to 10 types of concave portions or convex portions having different diameters.

By structuring as above, when used on a liquid crystal display device, etc., since the alignment of the plurality of concave portions or convex portions can be formed more distributed, and light can be scattered properly so as to prevent the occurrence of interference fringes more effectively.

Further, in forming the substrate with a light reflecting film of the present invention, preferably, the base includes a first base and a second base sequentially formed from below, and a plurality of concave portions or convex portions are formed on the first base, and a reflecting layer is formed on the second base as a continuous layer.

By structuring as above, since the reflecting layer is made to have a relatively smoothly-curved surface with little flat portion through the second base as a continuous layer, when used on a liquid crystal display device, etc. the occurrence of interference fringes can be prevented more effectively.

Further, according to another aspect of the present invention, there is provided a method of manufacturing a light reflecting film including a base and a reflecting layer, and the method includes the steps of: forming a first base having a plurality of concave portions or convex portions aligned randomly over a plane, by exposure of a coated photosensitive resin by using a mask, in which the positions of light-transmitting parts or non-light-transmitting parts are allocated according to a random function, and the light-transmitting parts or non-light-transmitting parts are aligned randomly over a plane; forming a second base having a plurality of continuous concave portions or convex portions by coating the surface of the first base with a photosensitive resin and exposing it; and forming the reflecting layer on the surface of the second base.

By performing as above, the reflecting layer can be made to have a relatively smoothly-curved surface through the first base including a plurality of concave portions or convex portions, and the second base formed thereon as a continuous layer. Therefore, the manufacturing thereof can be performed easily, and when used on a liquid crystal display device, etc. the light reflecting film having few interference fringes generated can be provided effectively.

Further, according to another aspect of the present invention, there is provided an optical display device including an optical device interposed between substrates and a light reflecting film provided on the opposite substrate to the viewing side of the optical device, the light reflecting film includes a base and a reflecting layer, the positions of a plurality of concave portions or convex portions formed on the base are allocated according to a random function, and the plurality of concave portions or convex portions are aligned randomly over a plane.

By structuring as above, the light reflecting film scatters light properly so that the occurrence of interference fringes on the optical display device can be prevented effectively. In addition, if the optical display device includes such a light reflecting film, since the surface is relatively flat, even with a light scattering film or a protective plate combined, it can be made to look good.

Further, in forming the optical display device of the present invention, it is preferable to provide a light scattering film on the substrate to the viewing side of the optical device.

When aligning a plurality of concave portions or convex portions randomly over a plane on the light reflecting film, there are found irregular stains in some cases, but by using the light reflecting film with the light scattering film, the occurrence of the irregular stains can be suppressed effectively.

Further, in forming the optical display device of the present invention, it is preferable to provide a protective plate on the viewing side of the optical display device.

By structuring as above, the mechanical intensity of the optical display device can be increased, and the optical display device can be made to look good.

Further, according to another aspect of the present invention, there is provided an electronic apparatus comprising an optical display device including a light reflecting film, the light reflecting film includes a base and a reflecting layer, the positions of a plurality of concave portions or convex portions formed on the base are allocated according to a random function, and the plurality of concave portions or convex portions are aligned randomly over a plane.

By structuring as above, since the light reflecting film scatters light properly, the occurrence of interference fringes on the electronic apparatus can be prevented effectively. In addition, if the electronic apparatus includes such a light reflecting film, since the surface is relatively flat, even with a light scattering film or a protective plate combined, the electronic apparatus can be made to look good.

BRIEF DESCRIPTION OF THE DRAWINGS

FIGS. 1a and b are plan views to illustrate a mask of the present invention.

FIGS. 9a and 9b are plan views and a sectional view of the light reflecting film formed of an asymmetric actually teardrop-shaped convex portion.

FIGS. 29a–29e illustrate processes for manufacturing a conventional liquid crystal display device.

DETAILED DESCRIPTION

The present invention will be further illustrated with examples below in reference to the drawings. It is apparent that each of the embodiments described as follows is just one example of the present invention and various modifications can be also possible within the scope and the spirit of the present invention without limitation to the description as follows.

First Embodiment

Figure 2:
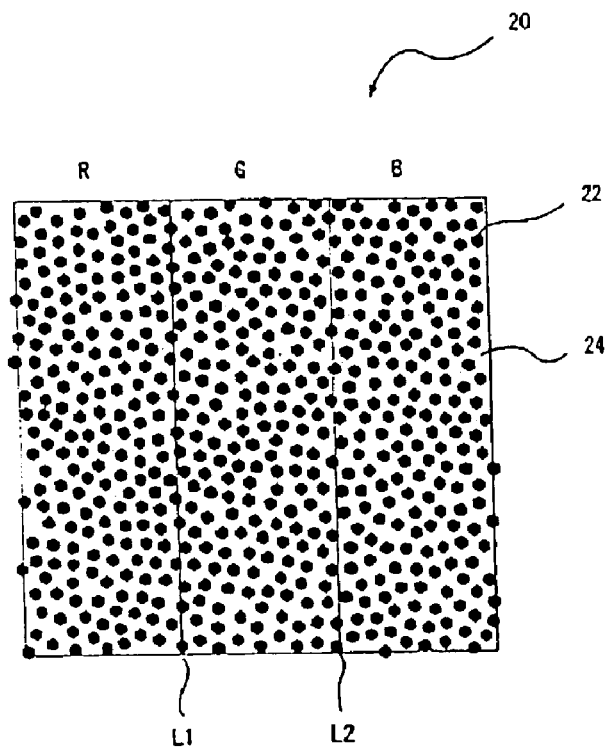
FIG. 2 is a plan view to illustrate a mask in which light-transmitting parts or non-light-transmitting parts are aligned randomly over a plane with 1 pixel (RGB: 3 dots) as one unit.

A first embodiment illustrates, for example, a mask 20 for manufacturing a light reflecting film as shown in FIG. 2, the positions of the light-transmitting parts or non-light-transmitting parts 22 are allocated according to a random function, and the light-transmitting parts or non-light-transmitting parts 22 are randomly aligned over a plane.

1. Light-Transmitting Part or Non-Light-Transmitting Part (1) Shape

The light-transmitting part or the non-light-transmitting part 22 preferably has a plane shape of discrete circle (including an ellipse, same as below) and polygon or any one of these as shown in FIG. 1(a), or preferably has a plane shape of overlapped circles (including an ellipse, same as below) and overlapped polygons or any one of these as shown in FIG. 1(b).

The reason is that concave or convex allocation of resin can be made complicated by making the plane shape of the light-transmitting part or non-light-transmitting part as a circle or polygon as above when performing an exposure process to manufacture a light reflecting film. In addition, since the circle or polygon is a basic figure, the manufacturing of a mask, itself, is easy.

Further, the polygon preferably includes quadrangle, pentagon, hexagon, octagon, etc.

(2) Diameter and Interval

Further, the diameter of the light-transmitting part or non-light-transmitting part in the mask is preferably any value within the range of 3 to 15 μm.

The reason is because if the diameter of the light-transmitting part or non-light-transmitting part is less than 3 μm, there often occurs a case in which it is difficult to precisely control the plane shape or an allocation pattern of the convex portions or concave portions even if an exposure process is used when manufacturing the light reflecting film. Further, if the diameter of the light-transmitting part or non-light-transmitting part is less than 3 μm, there even occurs a case in which it is difficult to manufacture the mask, itself.

In the meantime, if the diameter of the light-transmitting part or non-light-transmitting part exceeds 15 μm, it is difficult to properly scatter the light from the achieved light reflecting film so that scattering characteristics is deteriorated and dark reflection occurs.

Therefore, it is preferable to make the diameter of the light-transmitting part or non-light-transmitting part any value within the range of 5 to 13 μm, and it is more preferable to make it any value within the range of 6 to 12 μm.

Further, it is preferable to make the diameter of at least one of the light-transmitting parts or non-light-transmitting parts a value over 5 μm in the mask. That is, in the case that there exist the light-transmitting parts or non-light-transmitting parts having different diameters, if at least one light-transmitting part or non-light-transmitting part is made to have a diameter over 5 μm, the diameters of the rest of the light-transmitting parts or non-light-transmitting parts having different diameters can be made less than 5 μm.

The reason is that if the plane shape of all light-transmitting parts or non-light-transmitting parts is a circle or polygon being less than 5 μm in size, light is scattered excessively from the achieved light reflecting film, and dark reflection often occurs. However, if the diameter of the light-transmitting part or non-light-transmitting part becomes too large, the reflectivity of the glass side is increased and dark reflection occurs, too.

Further, if the light-transmitting part or non-light-transmitting part on the mask is made to exist independently, it is preferable to make the interval (pitch) any value within the range of 3.5 to 30 μm.

The reason is that, if the pitch of the light-transmitting parts or non-light-transmitting parts is a value less than 3.5 μm, the independency of the light-transmitting part or non-light-transmitting part may be decreased. In the meantime, the pitch of the light-transmitting parts or non-light-transmitting parts is a value over 30 μm, the random allocation of the light-transmitting parts or non-light-transmitting parts is decreased.

Therefore, the interval (pitch) of the light-transmitting parts or non-light-transmitting parts on the mask is preferably any value within the range of 5 to 20 μm, and more preferably, the interval (pitch) of the light-transmitting parts or non-light-transmitting parts is any value within the range of 7 to 15 μm.

Further, the pitch of the light-transmitting parts or non-light-transmitting parts is the interval from the center of a light-transmitting part or non-light-transmitting part to the center of adjacent light-transmitting part or non-light-transmitting part, and it is an average value of those of more than ten portions.

Further, in the case of overlapping the light-transmitting part or non-light-transmitting part on the mask, the interval is adjusted as a value several μm less than the above value.

(3) Types

Figure 7:
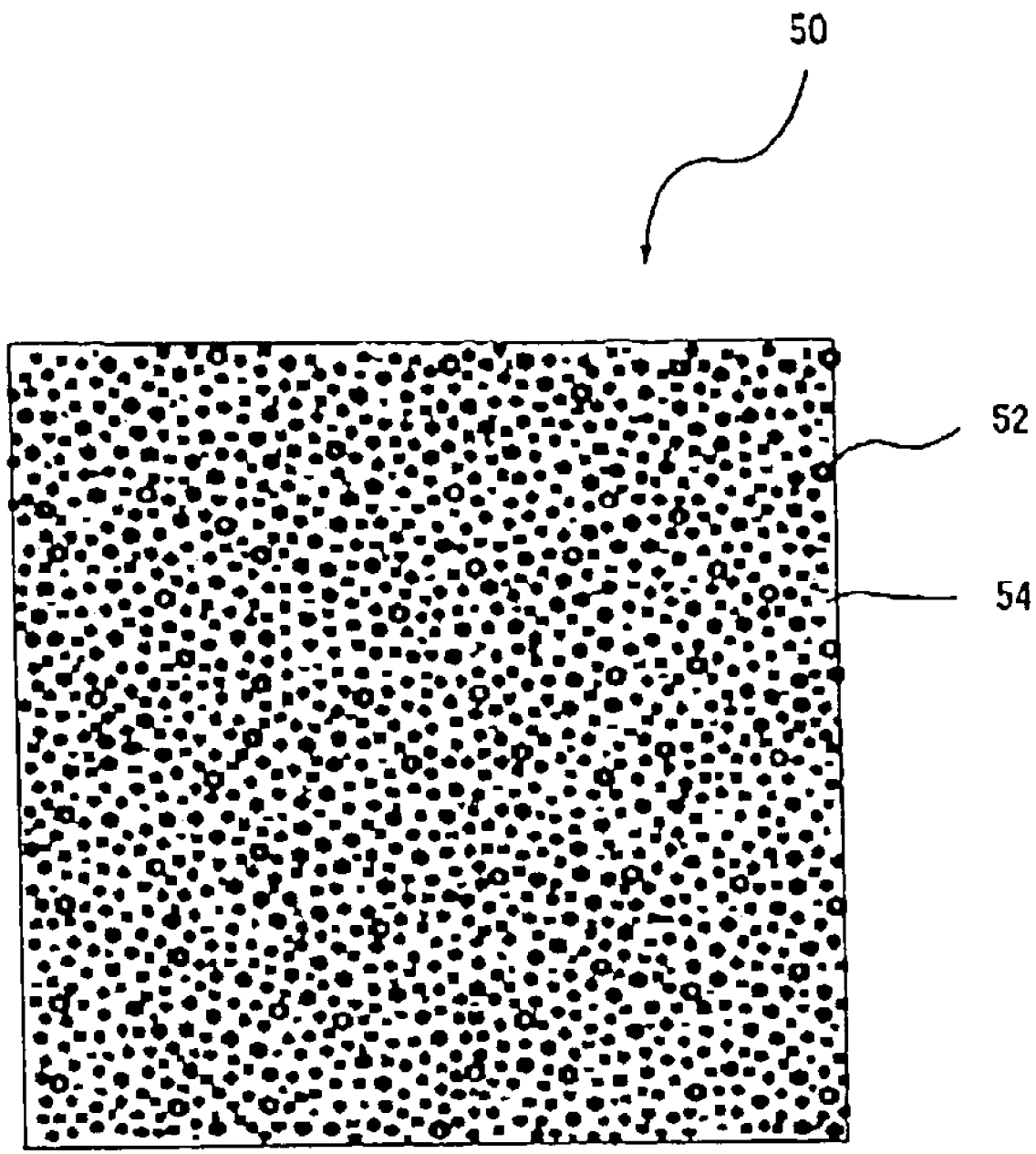
FIG. 7 is a plan view to illustrate a mask in which the diameter of the light-transmitting parts or non-light-transmitting parts is different.

Further, it is preferable to provide 2 to 10 types of light-transmitting parts or non-light-transmitting parts having different diameters in the mask. For example, as shown in FIG. 7, the light-transmitting parts or non-light-transmitting parts having different diameters are provided in one random pattern.

The reason is that the light reflecting film having few interference fringes generated can be manufactured more efficiently since the light-transmitting parts or non-light-transmitting parts having different diameters exist. That is, the concave portions or convex portions achieved when manufacturing a light reflecting film by using such a mask are aligned more scattered so that light is more properly scattered. Therefore, in the case of using such a light reflecting film on a liquid crystal display device, etc., the occurrence of interference fringes is more effectively prevented.

Further, as a combination of the patterns formed of the light-transmitting parts or non-light-transmitting parts having different diameters, there are preferable examples as follows.

1) combination of 7.5 μm hexagon pattern and 9 μm hexagon pattern 2) combination of 5 μm hexagon pattern, 7.5 μm hexagon pattern and 9 μm hexagon pattern 3) combination of 4.5 μm square pattern, 5 μm square pattern, 7.5 μm hexagon pattern, 9 μm hexagon pattern, 11 μm hexagon pattern (4) Area Percentage In addition, the area percentage of the light-transmitting parts or non-light-transmitting parts to the total area on the mask is preferably any value within the range of 10 to 60%.

The reason is that if the area percentage is a value less than 10%, when the light reflecting film is manufactured, the occupation space of a plurality of concave or convex portions is decreased, and the plane portion is widen, and the light scattering effect may be greatly decreased. In the meantime, even if the area percentage exceeds 60%, the plane portion is widen, and the light scattering effect can be greatly decreased.

Therefore, preferably, the area percentage of the light-transmitting parts or non-light-transmitting parts of the mask is any value within the range of 15 to 50% for the total area, and more preferably, it is any value within the range of 20 to 40%.

Further, when using a positive-type as photosensitive resin forming the device, the area percentage of the non-light-transmitting parts of the mask matters since the portion on which the light transmitted through the light-transmitting part is irradiated is photolyzed, and solubilized by a developing agent, and when using a negative-type, there matters the area percentage of the light-transmitting parts of the mask since the portion on which the light transmitted through the light-transmitting part is irradiated is photosensitized, and insolubilized by a developing agent.

2. Random Alignment (1) Random Alignment 1

For example as a first embodiment, as shown in FIGS. 1(a) and (b), the light-transmitting parts or non-light-transmitting parts on the mask are aligned randomly over a plane by the allocation of a random function.

That is, by using the mask which is not completely voluntary by the allocation of a random function, the advantages are as follows.

1. Since the design of the random alignment is automatic in some ways, the design of the mask pattern is easy and takes short time.

2. The search of the degrees of the desirable random alignment is easy in the mask pattern.

3. Since the design of the random alignment is not voluntary, the reproducibility of reflecting characteristics of the mask pattern is excellent in the case of the repeated design.

Further, the random alignment simply means that the light-transmitting parts or non-light-transmitting parts are aligned irregularly, but more specifically, means that the mask is cut and divided according to unit area, and each pattern is completely different when overlapping the mask, or not completely coincident even if there are portions which are partially overlapped.

(2) Random Alignment 2

Further, when allocating the light-transmitting parts or non-light-transmitting parts on the mask by a random function, it is preferable to generate a number of 0 to 1 by a random function, allocate numbers of 1 to n (n is a natural number of 2 to 1000) for the entire dots based on the number, and correspond n types of random patterns prepared in advance to the allocated numbers.

By doing the design as above, the mask pattern being not voluntary but having preferable reflecting characteristics is made easily and in a short time by generating a value 0 to 1 and using a simple random function.

Further, in the case of designing as above, even though it is necessary to prepare n types of random patterns in advance, since the design is possibly made with the design of each small-width random pattern compared with the case without using the random function, the design, itself of the mask pattern can be made simply and in a short time. For example, in the case of using the random function even with the mask for a 17 inches LCD panel, it is sufficient to prepare 12 types of random patterns in advance.

Furthermore, it is because the random pattern having preferable reflecting characteristics can be searchable easily and in a short time by properly changing the n types of random patterns. For example, even with the mask for a 17 inches LCD panel, the random pattern having preferable reflecting characteristics can be made by properly changing 12 types of random patterns.

(3) Random Alignment 3

Further, in allocating the light-transmitting parts or non-light-transmitting parts on the mask by a random function, it is preferable to align randomly over a plane by the standard of pixel electrodes, that is, RGB dots, in a liquid crystal display device, etc. on which the formed light reflecting film is used.

That is, it is preferable to make 100 to 2000 of RGB dots in the liquid crystal display device, etc. employing the light reflecting film one unit, repeat them, and align them randomly over a plane.

Figure 3:
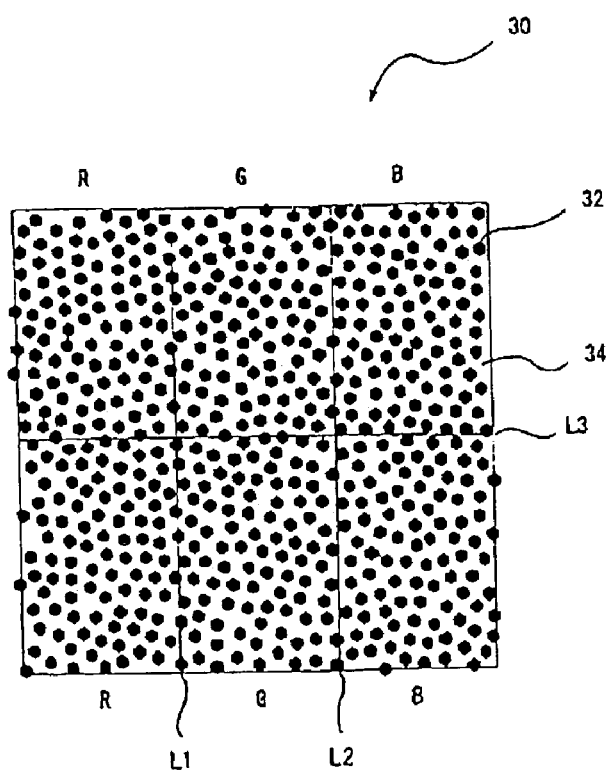
FIG. 3 is a plan view to illustrate a mask in which light-transmitting parts or non-light-transmitting parts are aligned randomly over a plane with 2 pixels (RGB: 6 dots) as one unit.
Figure 4:
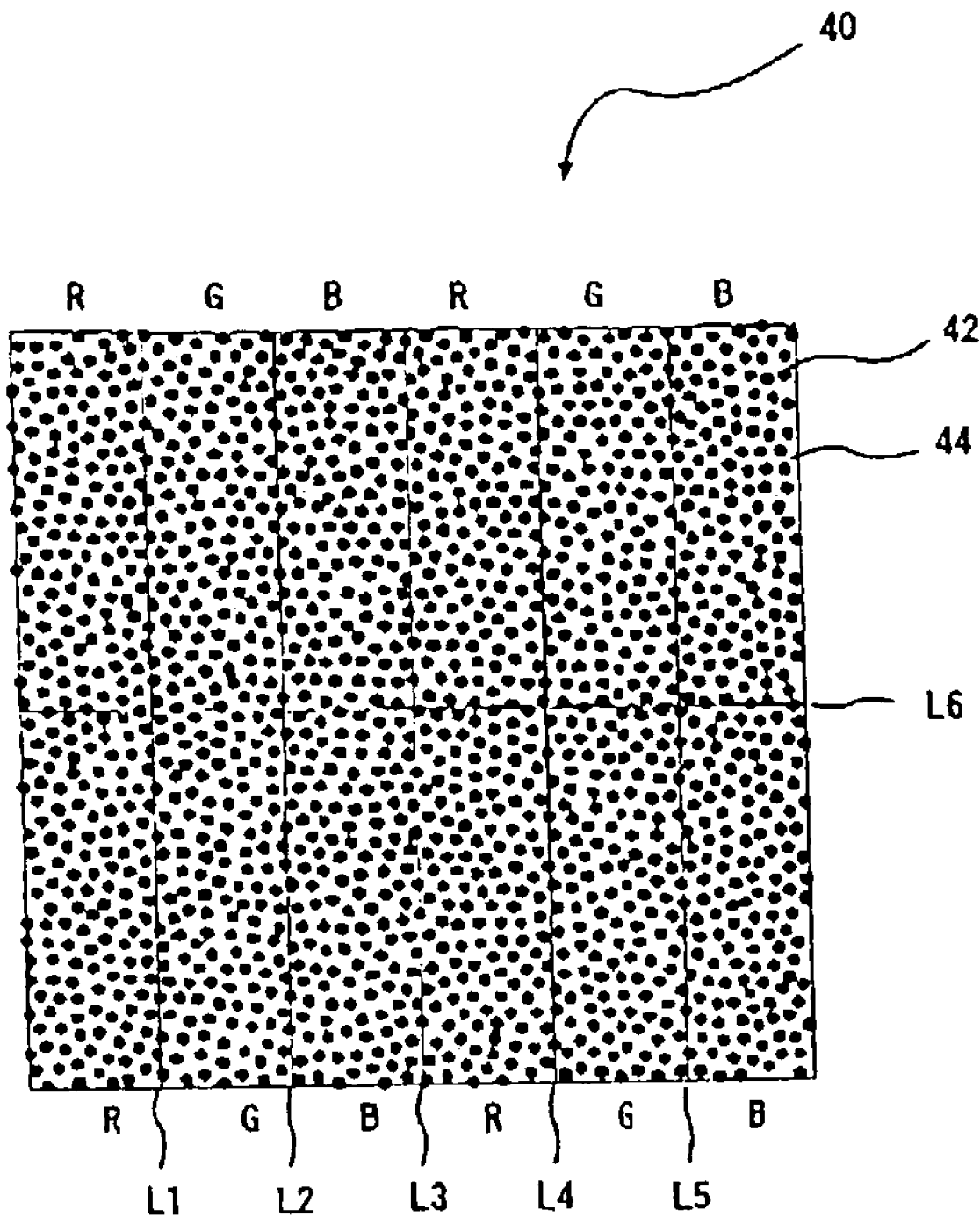
FIG. 4 is a plan view to illustrate a mask in which light-transmitting parts or non-light-transmitting parts are aligned randomly over a plane with 3 pixels (RGB: 12 dots) as one unit.
Figure 5:
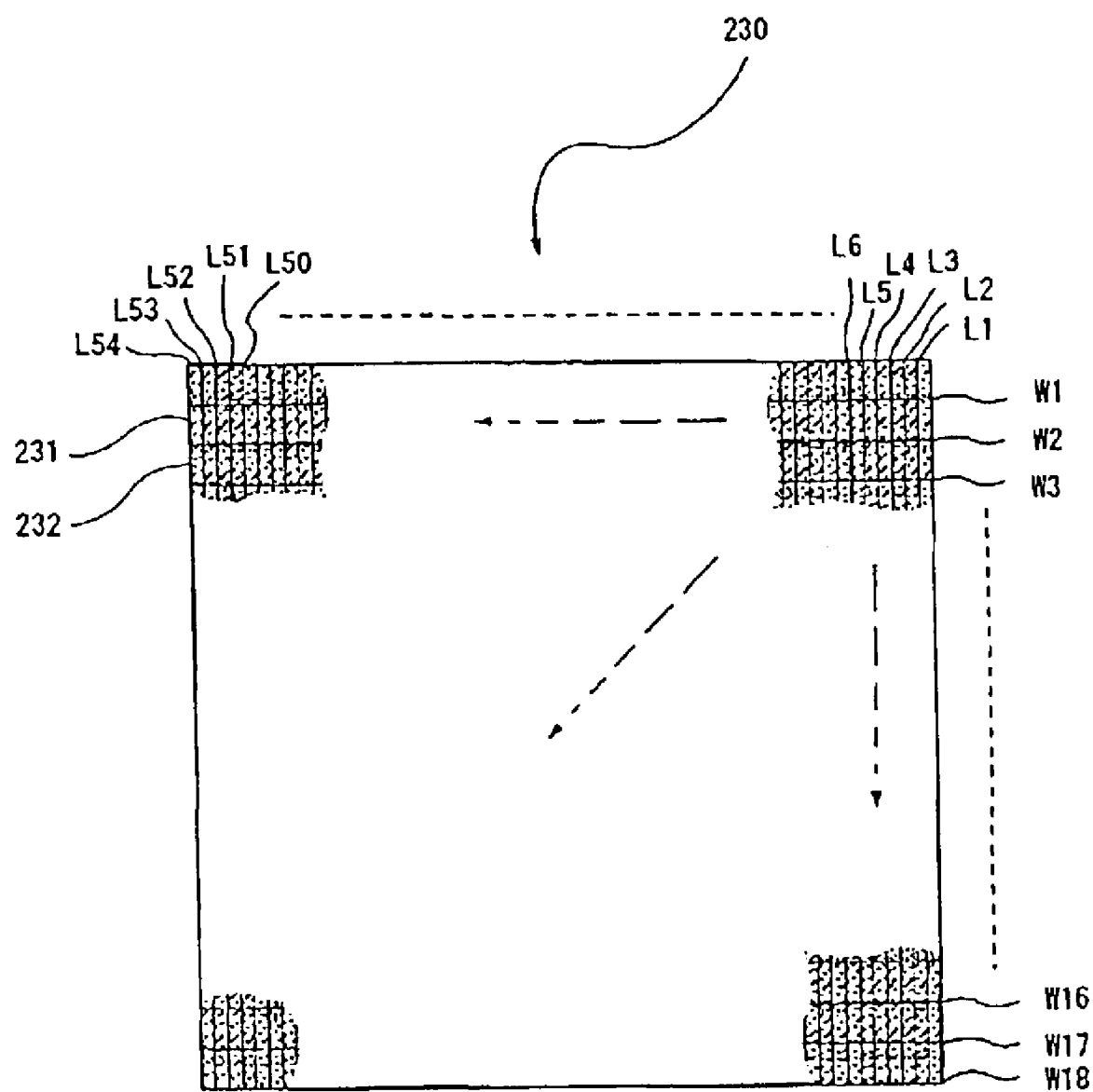
FIG. 5 is a plan view to illustrate a mask in which light-transmitting parts or non-light-transmitting parts are aligned randomly over a plane with 324 pixel (RGB: 972 dots) as one unit.

For example, as shown in FIGS. 2 to 4, it is also preferable to make 1 pixel (RGB: 3 dots), 2 pixels (RGB: 6 dots), or 4 pixels (RGB: 12 dots) as one unit, but as shown in FIG. 5, it is more preferable to make 324 pixels (RGB: 972 dots) one unit, and to repeat the random pattern formed of the light-transmitting parts or non-light-transmitting parts.

The reason is that the occurrence of interference fringes can be effectively prevented since a plurality of concave portions or convex portions on the light reflecting film to be achieved scatter light properly if the mask is formed by making several types of RGB dots one basic unit. Further, irregular stains sometimes occur if using the light reflecting film having a simple random pattern on a liquid crystal display device, etc., but if the light reflecting film includes the random pattern having a number of pixels as one unit as above, the generation of the irregular stains can be decreased effectively. In addition, since the light reflecting film can be patterned by making several types of RGB dots a basic unit, the information amount of the pattern can be reduced.

(4) Random Alignment 4

Figure 6:
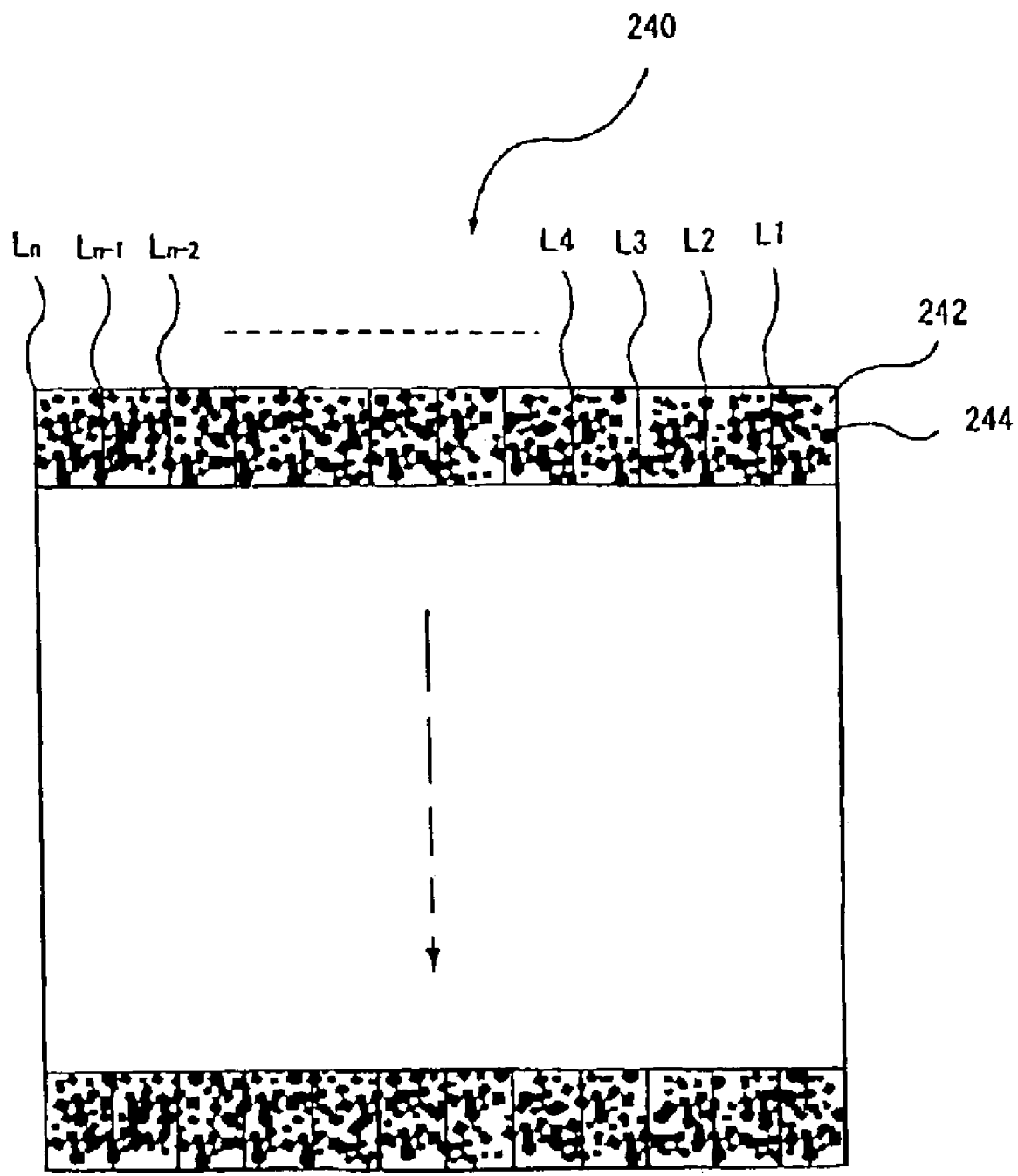
FIG. 6 is a plan view to illustrate a mask in which light-transmitting parts or non-light-transmitting parts are aligned randomly over a plane with one horizontal line as one unit.

Further, it is preferable to align the light-transmitting parts or non-light-transmitting parts randomly in the horizontal direction or in the longitudinal direction in allocating the light-transmitting parts or non-light-transmitting parts on the mask by a random function, as shown in FIG. 6.

By structuring as above just such that the random patterns are aligned in the horizontal direction or in the longitudinal direction, interference fringes due to the light reflecting film are prevented from being generated, and it is possible to design a random pattern having preferable reflecting characteristics easily and in a short time even with small amount of information. For example, it is sufficient to uniformly divide the mask for a 17 inches LCD panel into 1/n (n is a natural number of 2 to 1000) in the horizontal direction, to allocate the light-transmitting parts or non-light-transmitting parts on one mask pattern of the horizontal direction among the patterns by a random function, and to repeat them n times.

By repeating some units of random patterns in the horizontal direction or the longitudinal direction, the random pattern having preferable reflecting characteristics as a whole can be achieved with good reproducibility.

Second Embodiment

Figure 8:
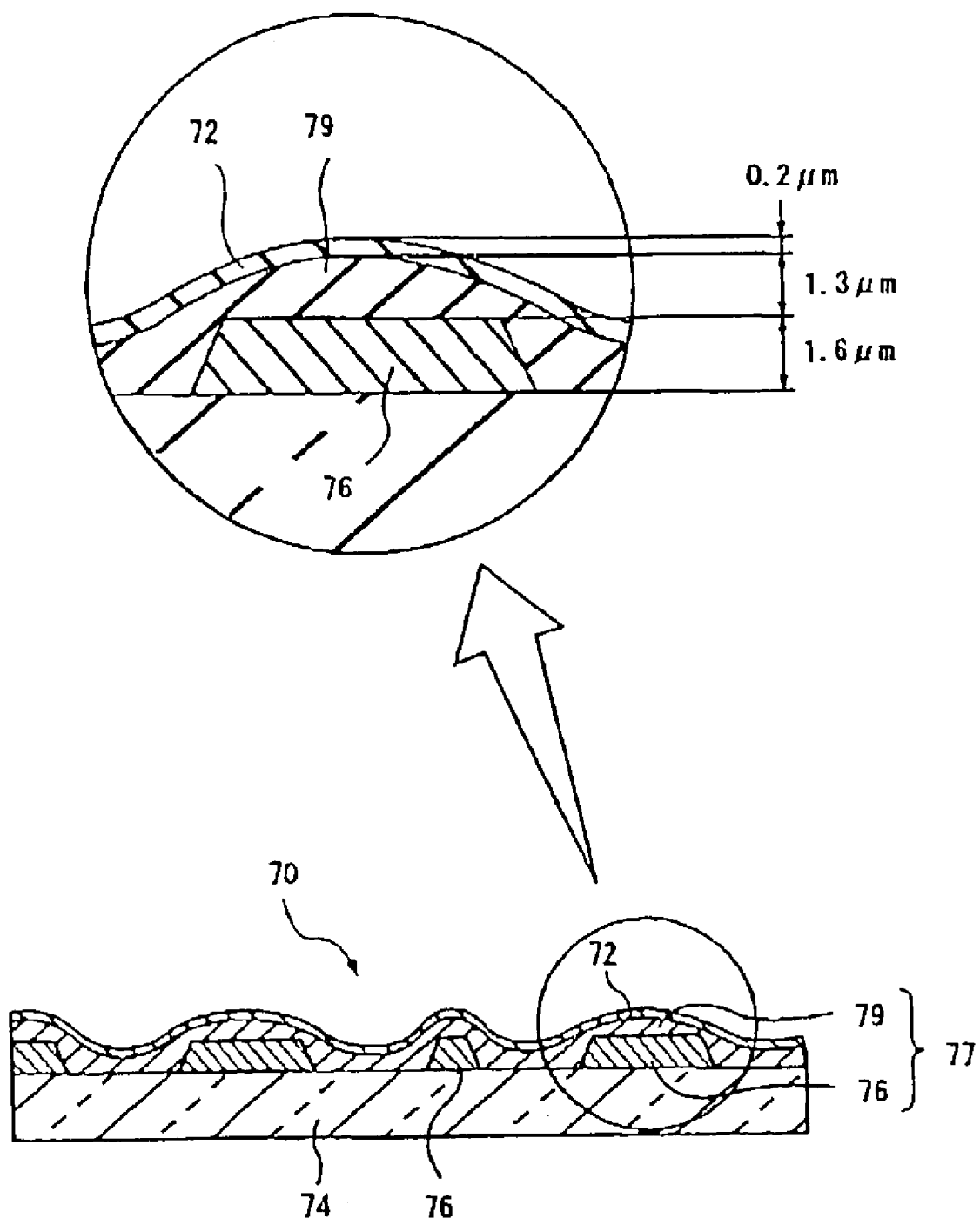
FIG. 8 is a sectional view of a light reflecting film including a first substrate and a second substrate.

A second embodiment illustrates an example of using a negative-type photosensitive resin as shown in FIG. 8, in which a substrate with a light reflecting film 70 includes a base 77 and a light reflecting layer 72, the positions of a plurality of concave portions formed on the base 77 are allocated according to a random function, and they are aligned randomly over a plane.

1. Base

As the structure of the base, as shown in FIG. 8, a first base 76 and a second base 79 are sequentially formed from below, the first base 76 being formed of a plurality of discrete or partially-overlapped concave portions, and the second base 79 being preferably a continuous layer.

By structuring as above, since a reflecting layer 72 formed over the continuous second base 79 is made to have a smoothly-curved shape with little flat portion, the occurrence of interference fringes can be effectively prevented when employed on a liquid crystal display device, etc. Further, in the case of a plurality of concave portions or convex portions formed on the base, when the base includes the first base and the second base, it generally means a plurality of concave portions or convex portions forming the first base.

Hereinafter, as an appropriate example, FIG. 8 illustrates the case in which the base 77 is formed of the first base 76 and the second base 79 from the lower side.

(1) First Base

It is preferable to make the height of a plurality of concave portions or the depth of a plurality of convex portions in the first base any value within the range of 0.5 to 5 $\mu$m.

The reason is that if the height of the concave portions or the depth of the convex portions is less than 0.5 $\mu$m, it is difficult to provide a reflecting layer having a properly-curved surface through the second base. In the meantime, if the height of the concave portions or the depth of the convex portions exceeds 5 $\mu$m, the concave portions or convex portions of the reflecting layer become increased so that light is scattered excessively or short-circuit occurs easily.

Therefore, the height of a plurality of concave portions or the depth of a plurality of convex portions in the first base is preferably any value within the range of 0.8 to 4 μm, and is more preferably any value within the range of 1 to 3 μm.

(2) Second Base

The height of continuous concave portions or the depth of convex portions in the second base is preferably any value within the range of 0.1 to 3 μm.

The reason is that if the height of the concave portions or the depth of the convex portions is less than 0.1 μm, in some cases, it is difficult to provide a reflecting layer having a properly curved surface over the second base. In the meantime, if the height of the concave portions or the depth of the convex portions exceeds 3 μm, the concave portions or convex portions of the reflecting layer become increased so that light is scattered excessively or short-circuit occurs easily.

Therefore, the height of a plurality of concave portions or the depth of a plurality of convex portions in the second base is preferably any value within the range of 0.1 to 2 μm, and is more preferably any value within the range of 0.3 to 2 μm.

(3) A Plurality of Concave Portions or Convex Portions

1. Plane Shape of Concave Portions or Convex Portions

The plane shape of a plurality of concave portions or convex portions formed on the base is preferably shaped like discrete circle and polygon or any one of these, or overlapped circles and overlapped polygons or any ones of these.

The reason is that it is possible to precisely control the plane shape or the allocation pattern of a plurality of concave portions or convex portions by making the plane shape of discrete circle and polygon or any one of these, or overlapped circles and polygons, or any ones of these and exposing it. Further, if the concave portions or convex portions have the same plane shapes as the above, it is possible to effectively prevent the occurrence of interference fringes because of scattering light.

Further, as proper example of the plane shape of the concave portion, FIG. 9(a) illustrates an off-set oval shape (tear drop shape) or FIG. 9(b) illustrates an off-set rectangular shape (oblique pyramid). As proper examples of the plane shape of the convex portion, FIGS. 19 to 23 illustrate an oval-dome shape, a tear drop shape, an oblique pyramid shape, a rectangular trough shape and a pyramid shape.

Figure 10:
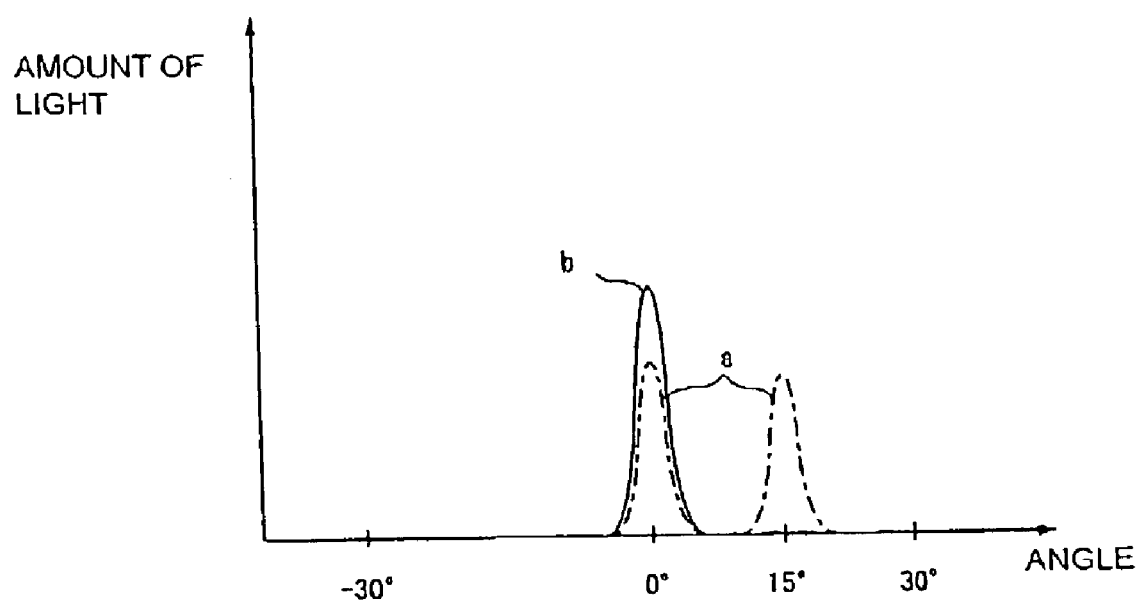
FIG. 10 is a graphical representation to illustrate the relation of the light quantity coming into eyes and the viewing angle.

The reason is that light-directivity can be increased with light scattering characteristics maintained, along with the tilted side of the longitudinal direction, as shown in FIG. 10 by making the plane shapes of a plurality of concave portions or convex portions the same plane shapes as above. In FIG. 10, the dotted line a shows the quantity of light observed in the case of the off-set oval shape as shown in FIG. 9(a), and the solid line b shows the quantity of light observed in the case of the uniform circular shape which is not off-set. Therefore, by making the plane shapes as above, when viewed from a certain direction, for example, from the location at +15°, the quantity of light observed is increased so that bright display images can be recognized from the location.

2. Diameter of Concave Portions or Convex Portions

Further, for a plurality of concave portions or convex portions formed on the base, it is preferable to make the diameter of the concave portions or convex portions any value within the range of 3 to 15 μm.

The reason is that if the diameter of the concave portions or convex portions is within the ranges as above, it is possible to precisely control the plane shape or allocation pattern of a plurality of concave portions or convex portions by using an exposure process, and it is possible to effectively prevent the occurrence of interference fringes by properly scattering light. Further, if the diameter of a plurality of concave portions or convex portions is within the ranges as above, irregular stains are rarely seen.

Therefore, the diameter of a plurality of concave portions or convex portions is preferably any value within the range of 5 to 13 μm, and it is more preferably any value within the range of 6 to 12 μm.

Further, it is preferable to provide the plurality of concave portions or convex portions having different diameters, for example, 2 to 10 types of concave portions or convex portions. By structuring as above, complicated light reflection is made possible, which cannot be achieved from one type of concave portions or convex portions, so as to diffuse and scatter light more. Therefore, by providing a plurality of concave portions or convex portions having different diameters, the occurrence of interference fringes can be prevented more effectively.

3. Height of Concave Portions or Depth of Convex Portions

Further, for a plurality of concave portions or convex portions formed over the base, the height of concave portions or the depth of convex portions is preferably any value within the range of 0.1 to 10 μm.

The reason is that if the height of concave portions or the depth of convex portions is less than 0.1 μm, the concave or convex is small and the scattering characteristics is decreased even if using an exposure process. In the meantime, if the height of concave portions or the depth of convex portions exceeds 10 μm, the concave or convex of a reflecting layer becomes great, and light is scattered excessively or short-circuit occurs easily.

Therefore, the diameter of a plurality of concave portions or convex portions is preferably any value within the range of 0.2 to 3 μm, and it is more preferably any value within the range of 0.3 to 2 μm.

4. Random Alignment 1

A plurality of concave portions or convex portions are formed on the surface of the base, in which especially, the positions of a plurality of concave portions or convex portions forming the first base are allocated according to a random function, and they are aligned randomly over a plane.

On contrast, the reason is that if the plurality of concave portions or convex portions are aligned regularly, the interference fringes are generated when used in a liquid crystal display device, etc. so as to deteriorate the quality of display seriously.

Further, by aligning randomly by a random function, the alignment of a plurality of concave portions or convex portions is automatically designed to some extent, and the degree of preferable random alignment can be easily searchable, and the reproducibility of the reflecting characteristics is excellent even if the alignment is repeatedly designed.

Further, it is preferable to make the height of a plurality of concave portions or the depth of a plurality of the convex portions substantially equal. The reason is that if the height of a plurality of concave portions or the depth of a plurality of the convex portions is not equal as disclosed in Japanese Unexamined Patent Application Publication No. 6-27481 or Japanese Unexamined Patent Application Publication No. 11-281972, the manufacturing is difficult and the occurrence of interference fringes cannot be stably suppressed.

5. Random Alignment 2

Further, in aligning a plurality of concave portions or convex portions randomly over a plane, it is preferable to randomly align 100 to 2,000 of RGB dots as one unit in a liquid crystal display device, etc. using a light reflecting film.

The reason is that the plurality of concave portions or convex portions scatter light properly and prevent the occurrence of interference fringes effectively even with the plurality of concave portions or convex portions having several RGB dots as one unit. If using a light reflecting film having a simple random pattern in a liquid crystal display device, etc., irregular stains are generated in some cases, but the generation of the irregular stains can be decreased effectively if the light reflecting film includes a random pattern having some pixels as one unit as above. Further, since they are patterned with RGB dots as one unit, the amount of pattern information can be reduced, and the alignment of the pattern, etc. when manufacturing the light reflecting film is performed easily.

6. Random Alignment 3

Further, in aligning a plurality of concave portions or convex portions randomly as a whole over a plane, it is preferable to align the plurality of concave portions or convex portions randomly in the horizontal direction or in the longitudinal direction, and repeat them.

By structuring as above, it is possible to design a random pattern having preferable reflecting characteristics as a whole and formed of the plurality of concave portions or convex portions easily and in a short time even with small amount of information. For example, it is sufficient to uniformly divide the light reflecting film for a 17 inches LCD panel into 1/n (n is a natural number of 2 to 1000) in the horizontal direction, and among them, to allocate the random pattern formed of the plurality of concave portions or convex portions in the light reflecting film in the horizontal direction by a random function, and to repeat them n times.

Further, by repeating random patterns formed of a plurality of concave portions or convex portions in the horizontal direction or in the longitudinal direction as above, the light reflecting film having preferable reflecting characteristics as a whole can be achieved with good reproducibility.

(4) Opening

In the light reflecting film, it is preferable to provide an opening for partially passing light therethrough. By structuring as above, it can be used in a hybrid reflecting/transmitting type liquid crystal display device, etc.

Figure 11:
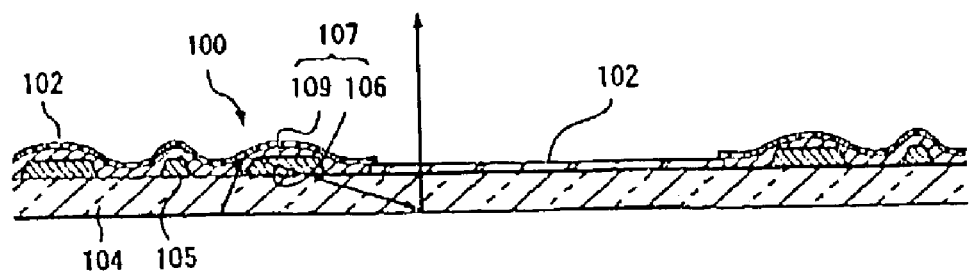
FIG. 11 is a sectional view of a light reflecting film having an opening.

That is, as shown in FIG. 11, the light from the outside can be effectively reflected by the light reflecting film 100 by providing an opening 102 on a part of the light reflecting film 100, and the light from the inside can be effectively discharged through the opening 102.

Further, the size of the opening is not limited to a specific one so that it is preferable to determine according to the purposes of the light reflecting film, for example, it is preferable to determine as any value within the range of 5 to 80% with the overall width of the light reflecting film being 100%, and any value within the range of 10 to 70% will be more preferable, and any value within the range of 20 to 60% is still more preferable.

2. Reflecting Layer (1) Thickness

It is preferable to make the thickness of the reflecting layer in the light reflecting film any value within the range of 0.05 to 5 $\mu$m.

The reason is that if the thickness of the reflecting layer is less than 0.05 $\mu$m, the reflecting effect is rapidly decreased. In the meantime, if the thickness of the reflecting layer exceeds 5 $\mu$m, the flexibility of the achieved light reflecting film is decreased, or the time for manufacturing can be increased excessively.

Therefore, the thickness of the reflecting layer is preferably any value within the range of 0.07 to 1 $\mu$m, and it is more preferably any value within the range of 0.1 to 0.3 $\mu$m.

(2) Types

Further, the component material of the reflecting layer is not limited to a specific one, and metal materials having an excellent conductivity or light reflectivity such as, aluminum (Al), silver (Ag), copper (Cu), gold (Au), chrome (Cr), tantalum (W), and nickel (Ni), etc. are preferable.

Further, a transparent conductive material such as indium tin oxide (ITO), indium oxide (IO) or tin oxide (TO), etc. is preferably formed on the reflecting layer.

However, when using the metal material or transparent conductive material, if soluble by the liquid crystal, an electric insulating film is preferably provided on the surface of the reflecting film formed of the metal material, etc., or a sputtering of an electric insulating material is preferably performed besides the metal material or the like.

(3) Base Layer

Further, when forming the reflecting layer on the second substrate, a base layer is preferably formed with a thickness of 0.01 to 2 $\mu$m to improve the adhesiveness and make the reflecting layer a smoothly-curved surface.

Further, as component material of the bottom layer, there are a single kind, or two kinds or more of composition such as silane coupling material, titanium coupling material, aluminum coupling material, aluminum-magnesium alloy, aluminum-silane alloy, aluminum-copper alloy, aluminum-manganese alloy, aluminum-gold alloy, etc.

(4) Reflectivity of the Glass Surface

Further, the reflectivity of the glass surface in the reflecting layer is preferably any value within the range of 5 to 50%.

The reason is that if the reflectivity of the glass surface is less than 5%, the brightness of the display images used in a liquid crystal display device, etc. is decreased excessively. In the meantime, if the reflectivity of the glass surface exceeds 50%, the scattering is decreased, and the images on the back or the external light is reflected from the glass surface excessively.

Therefore, the reflectivity of the glass surface in the reflecting layer is preferably any value within the range of 10 to 40%, and it is more preferably any value within the range of 15 to 30%.

3. The Combination with Other Component Materials

Figure 15:
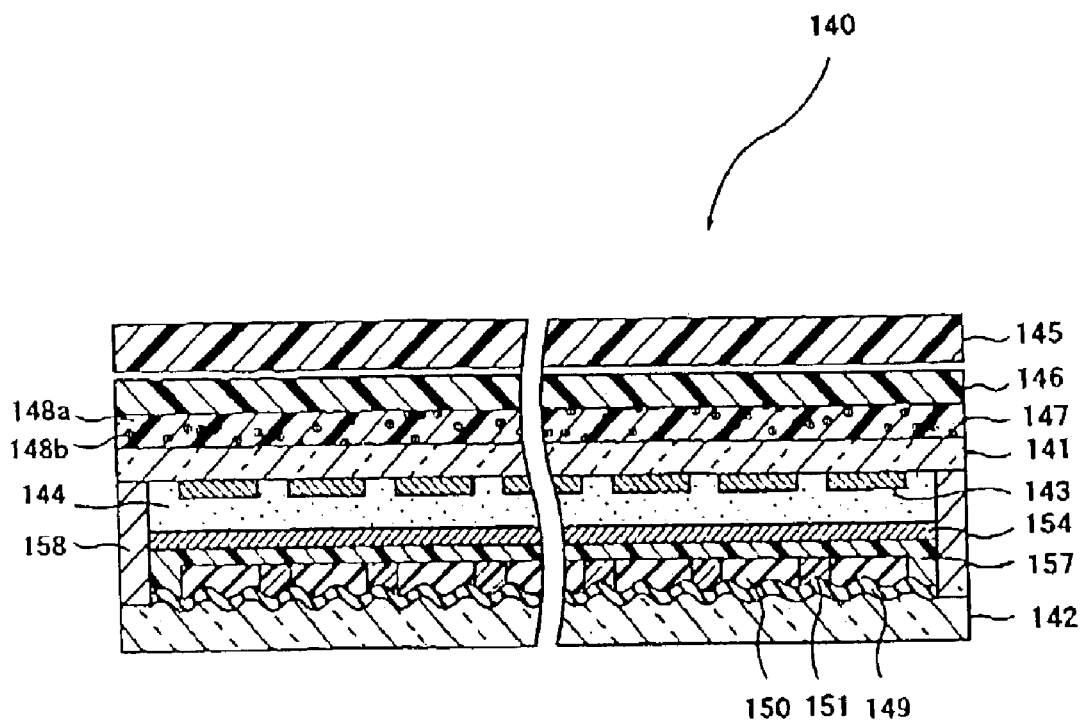
FIG. 15 is a sectional view to illustrate a structure of a passive matrix-typed liquid crystal display device.
Figure 16:
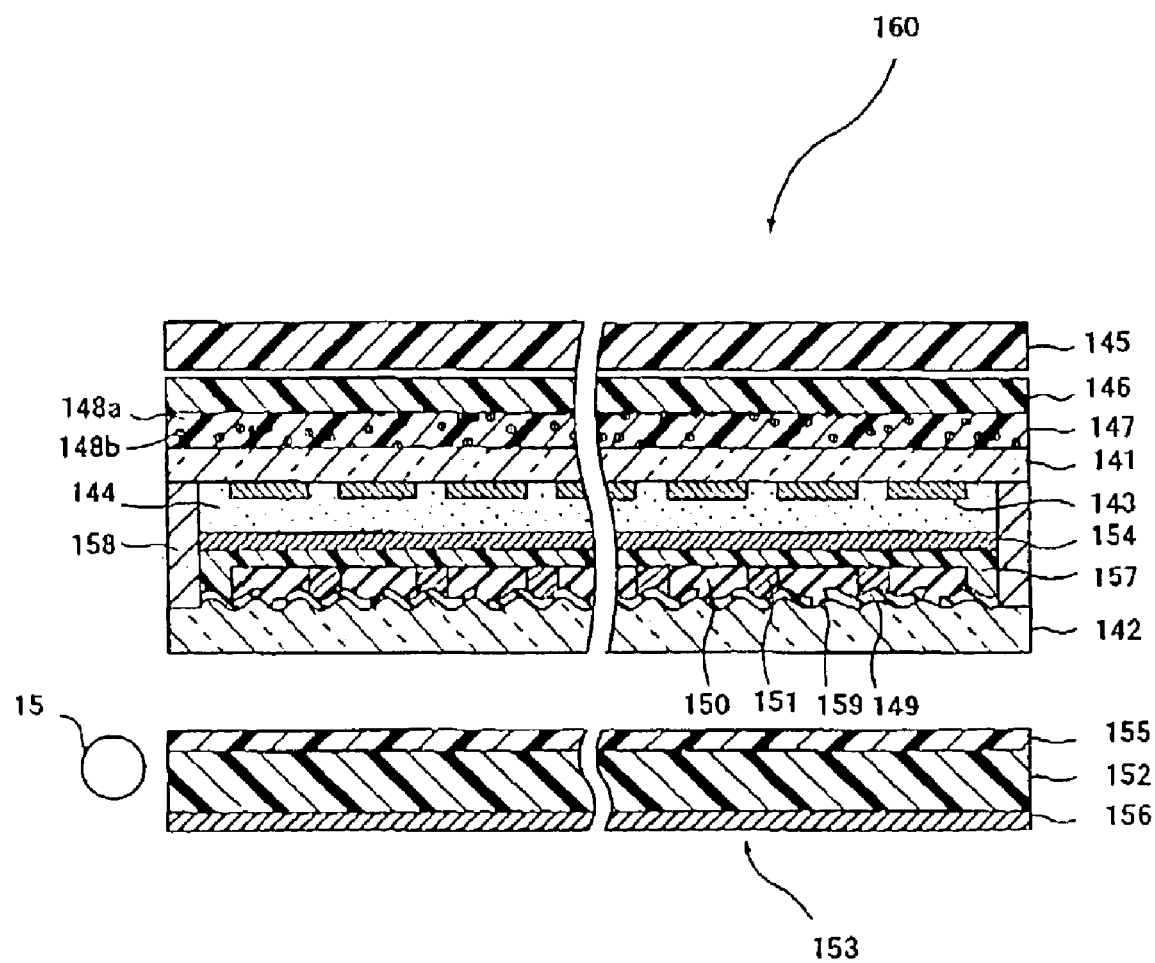
FIG. 16 is a sectional view to illustrate a structure of another typed liquid crystal display device.

It is preferable to combine the light reflecting film with other component materials, for example, as shown in FIGS. 15 and 16, a color filter 150, a light-shielding layer 151, an overcoat layer 157, a plurality of transparent electrodes 154, and an oriented film, etc.

By combining as above, the material of a color liquid crystal display device, etc. having few interference fringes generated can be effectively supplied. Colorization can be easily achieved by combining a color filter 150 such as stripe alignment, mosaic alignment, or delta alignment, etc. formed of the 3 color elements of RGB (red, green, blue), and in addition, by combining the light-shielding layer 151, images having an excellent contrast can be achieved. Further, the light reflecting film can be used as a reflecting electrode, but by providing other electrodes, for example, the transparent electrode 154, the light absorption can be prevented, and the effect of the reflecting film formed of a plurality of concave portions or convex portions can be eliminated.

Further, it is also preferable to form the color filter with 3 color elements of YMC (yellow, magenta, cyan), and it has excellent light transmission characteristics so that brighter display image can be achieved when used in a reflective liquid crystal display device.

Third Embodiment

The third embodiment illustrates a manufacturing method of a light reflecting film having a base and a reflecting layer, and the third embodiment includes the steps of forming a first base having a plurality of concave portions or convex portions which are aligned randomly over a plane for a coated photosensitive resin by using a mask and exposing it, in which the positions of light-transmitting parts or non-light-transmitting parts are allocated according to a random function, and the light-transmitting parts or non-light-transmitting parts are aligned randomly over a plane by a random function; of forming a second base having a plurality of continuous concave portions or convex portions by coating the surface of the first base with a photosensitive resin and exposing it; and of forming a reflecting layer on the surface of the second base.

Figure 12:
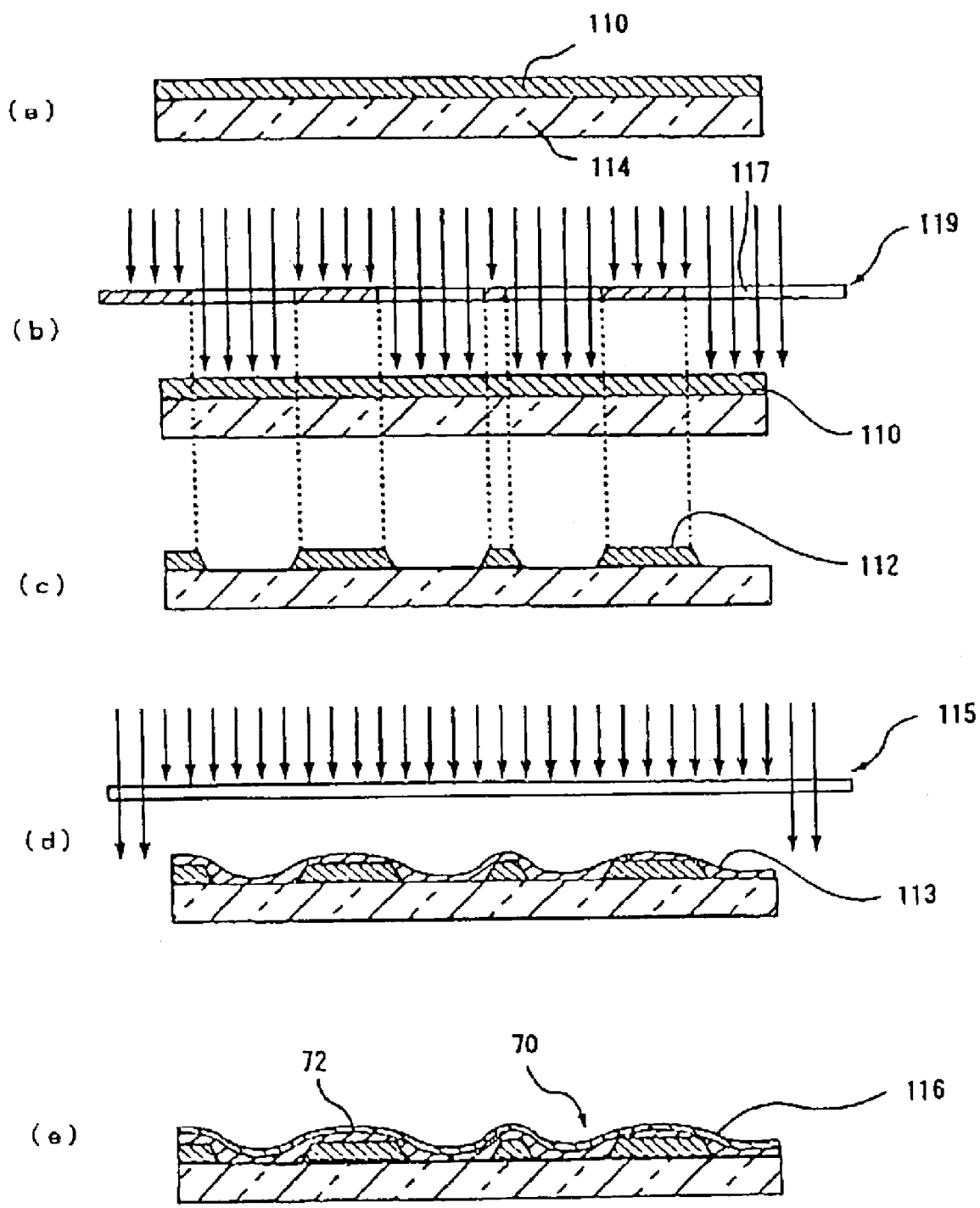
FIGS. 12a–12e illustrate processes for manufacturing a light reflecting film.
Figure 13:
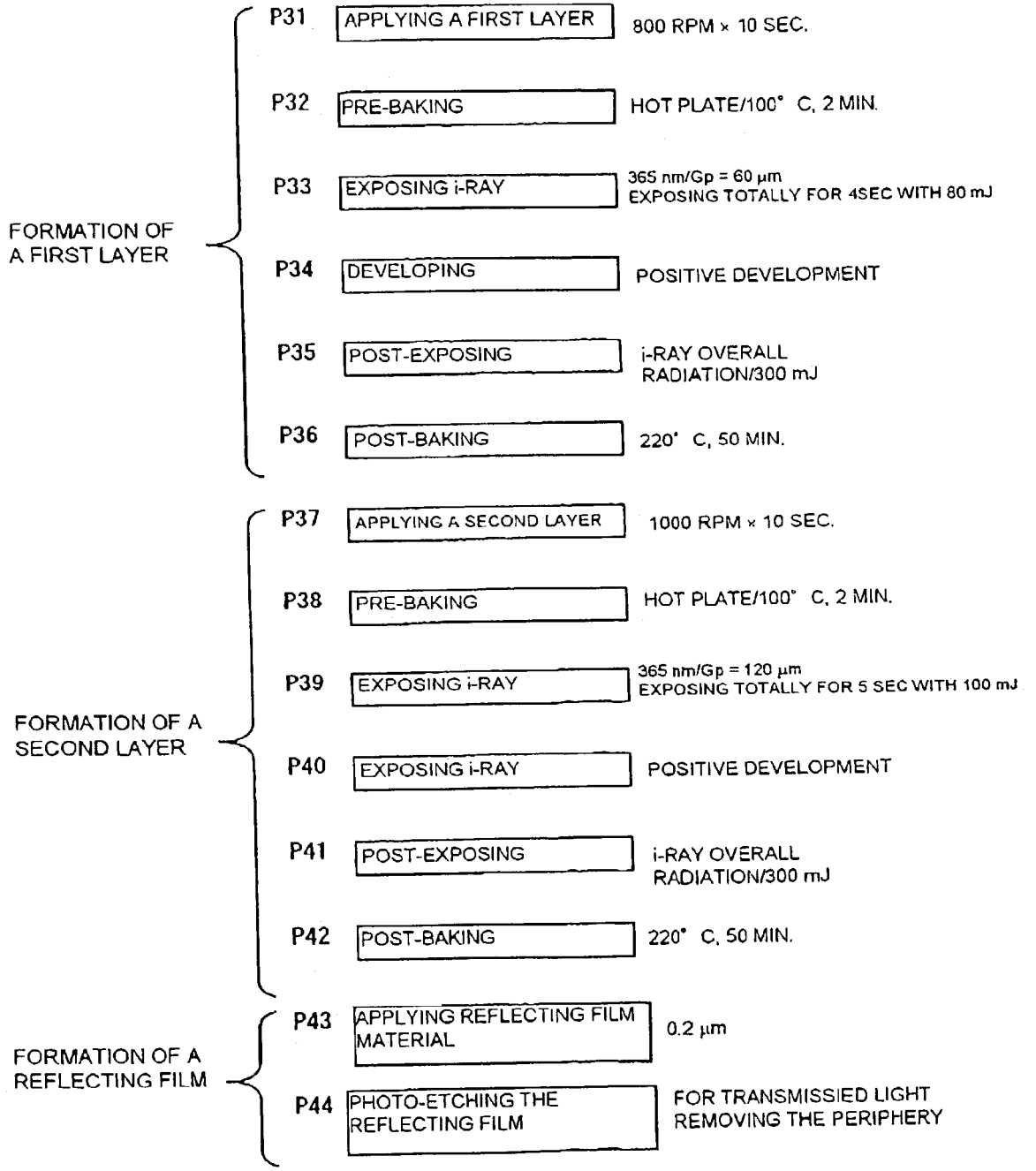
FIG. 13 is a flow chart to illustrate manufacturing processes of the light reflecting film.
Figure 14:
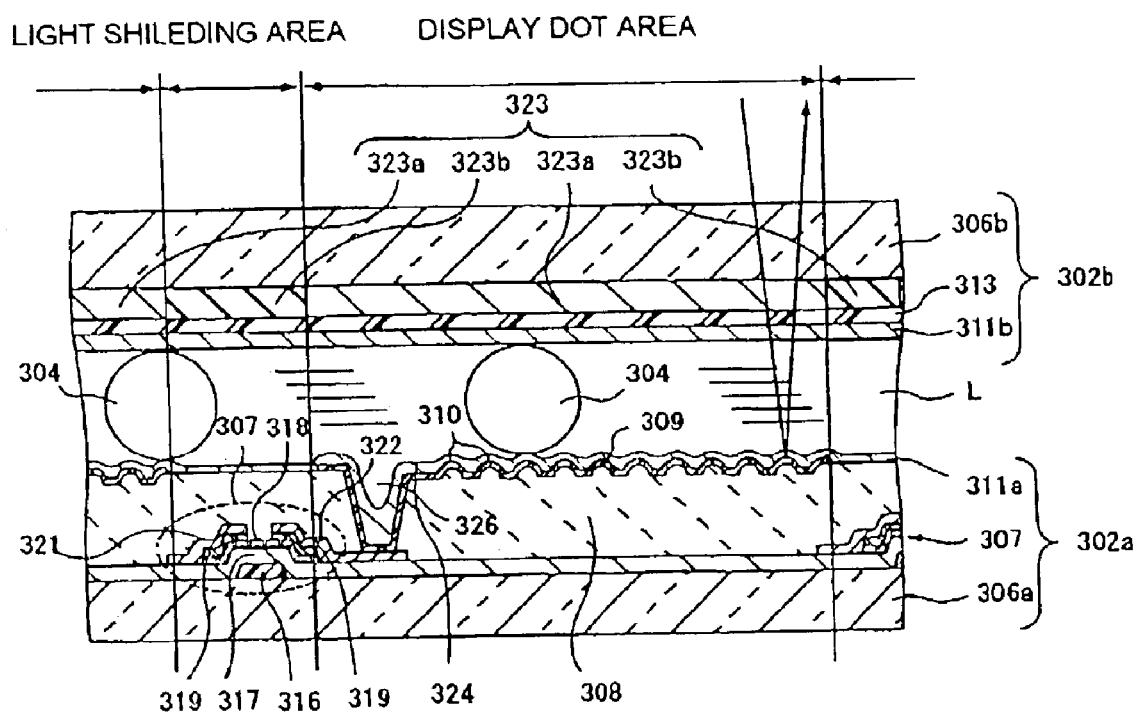
FIG. 14 is a sectional view to illustrate the light reflecting film which is electrically connected to a TFT device.

Herein after, a method of manufacturing a light reflecting film (substrate with a light reflecting film) is explained by an example of forming concave portions on the surface of the first base in reference to FIGS. 12 and 13. FIG. 12 illustrates processes of manufacturing the light reflecting film, and FIG. 13 is a flow chart of the processes.

1. Process of Forming a First Base

A plurality of concave portions or convex portions aligned over a plane randomly or discretely are preferably formed by a photosensitive resin by using a mask described in the first embodiment and exposing it.

That is, by using a mask, in which the light-transmitting parts or non-light-transmitting parts have plane shapes of discrete or partially-overlapped circle and polygon, or any one of these, and are aligned over a plane by a random function, a plurality of concave portions or convex portions aligned randomly over a plane are formed by a photosensitive resin, for example, positive-type photosensitive resin by exposure.

(1) Photosensitive Resin

The kind of the photosensitive resin forming the first base is not limited to a specific one, and there are, for example, a single kind or two kinds or more of composition such as acrylic resin, epoxy resin, silicon resin, phenol resin, oxytan resin. Further, an inorganic filler such as silica particles, titanium oxide, zirconia oxide, aluminum oxide, etc. can be preferably added to the photosensitive resin so as to improve the precision and make a circle shape or a polygon shape.

Further, there are two kinds of the photosensitive resin forming the first base; a positive-type in which the portion on which the light transmitting through the light-transmitting part is irradiated is photolyzed, and solubilized by a developing agent, and a negative-type in which the portion on which the light transmitting through the light-transmitting part is irradiated is hardened and insolubilized by a developing agent, both of which are usable appropriately.

(2) Exposure Process

As shown in FIG. 12(a) and in the process P31 of FIG. 13, when forming a first base 112, it is preferable to uniformly coat a support part 114 with a photosensitive resin forming the first base by using a spin coater, and form a first layer 110.

In this case, the spin coater is preferably set to revolve at 600 to 2,000 rpm for 5 to 20 sec.

Then, in order to improve a resolution as shown in the process P32 of FIG. 13, it is preferable to pre-bake the first layer 110. In this case, it is preferable to use, for example, a hot plate at temperature of 80 to 120° C. for 1 to 10 minutes for heating.

Then, as shown in FIG. 12(b) and in the process P33 of FIG. 13, it is preferable to place a mask 119 in the first embodiment on the first layer 110 formed of uniformly coated photosensitive resin, and expose an i-ray, etc. In this case, the exposure amount on the i-ray, etc. is preferably any value within the range of 50 to 300 mJ/cm$^2$.

Then, as shown in FIG. 12(c) and in the process P34 of FIG. 13, for example, the portion transmitting through the light-transmitting part 117 of the mask 119 is positively developed by a developer so as to form a first base 112 aligned randomly in planar direction, and formed of a plurality of concave portions or convex portions independently (separately) formed or partially overlapped.

Further, before forming a second base 113, as shown in the process P35 in FIG. 13 and FIG. 36, post-exposure as a whole can be preferably performed with an exposure amount of 300 mJ/cm$^2$ as one example, and preferably, post-bake can be performed by heating up to the temperature of 220° C. for 50 minutes so as to make the first base 112 more hardened.

2. Process for Forming a Second Base

The process for forming a second base is the process for forming a second base as a continuous layer over the first base, that is, a plurality of convex portions, which are aligned randomly over a plane, by coating resin, etc.

(1) Photosensitive Resin

The kind of the photosensitive resin forming the second base is not limited to a specific one, but there are, for example, acrylic resin, epoxy resin, silicon resin, phenol resin, etc.

Further, in order to improve the adhesiveness between the first base and the second base, it is preferable to make the photosensitive resin of the second base equal to the photosensitive resin of the first base.

Further, in order to improve the adhesiveness between the first base and the second base, it is preferable to treat the surface of the first base with a silane coupling material, etc.

(2) Exposure Process

As shown in FIG. 12(d), and in the processes P37 to P40 of FIG. 13, in order to form a second base 113, it is preferable to coat with a photosensitive resin forming the second base 113, to expose an i-ray on the mounted region around a panel display region, and to remove the resin layer. In this case, like in the case of exposing the first base 112, the exposure amount of the i-ray, etc. is preferably, for example, any value within the range of 50 to 300 mJ/cm$^2$.

Further, as shown in the processes P41 to P42 in FIG. 13, after forming the second base 113, post-exposure as a whole can be preferably performed with an exposure amount of 300 mJ/cm$^2$ as one example, and preferably, post-bake can be performed by heating up to the temperature of 220° C. for 50 minutes so as to make the first base 112 and the second base 113 more hardened.

3. Process for Forming a Reflecting Layer

As shown in FIG. 12(e), and in the processes P43 to P44 of FIG. 13, the process for forming a reflecting layer is a process for forming a reflecting layer 116 having a smoothly-curved surface so as to properly scatter light on the surface of the second base 113.

(1) Material for a Reflecting Layer

As the material for the reflecting layer, it is preferable to use the metal material having an excellent light reflectivity such as aluminum (Al) or silver (Ag), etc. as explained in the second embodiment.

(2) Formation Method

It is preferable to form a reflecting layer by using the method of a sputtering, etc. Further, the material for the reflecting layer existing other than the desired portion can be removed by using a photo-etching, etc.

Further, since the surface of the second base has concave or convex, the material of the reflecting layer is not formed with a uniform thickness in some cases, and in such a case, it is preferable to employ a rotation deposition technique or a rotation sputtering technique.

Further, it is preferable to form a reflecting layer, and electrically connect the reflecting layer for a terminal of TFT (Thin Film Transistor) or MIM (Metal Insulating Metal), etc.

Fourth Embodiment

The fourth embodiment illustrates an active matrix-typed liquid crystal display device using TFD (Thin Film Diode) as two terminal active device, and the liquid crystal display device includes a liquid crystal device interposed between substrates, a substrate with a light reflecting film provided on the substrate opposite to the viewer of the liquid crystal device. The substrate with a light reflecting film includes a base and a reflecting layer, the positions of a plurality of concave portions or convex portions formed on the base are allocated according to a random function, and the plurality of concave portions or convex portions are aligned randomly in a planar direction.

Hereinafter, the embodiment is explained in detail in reference to FIGS. 24 to 26, and with an example of a semi-transmission and reflection type liquid crystal display device being capable of selectively performing a reflecting display by using an external light and a transmission display by using an illuminating device.

Figure 24:
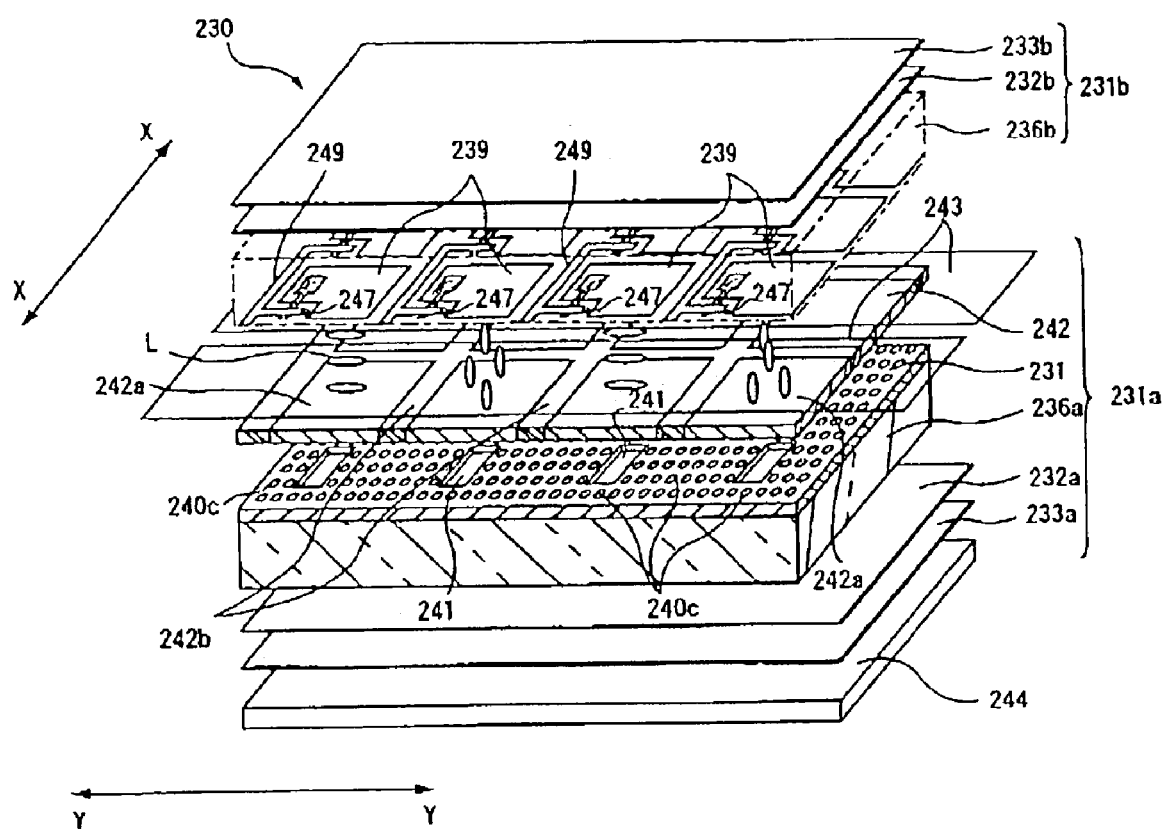
FIG. 24 is an exploded view of a TFD-typed liquid crystal display device.

First, a liquid crystal display device 230 in this embodiment, as shown in FIG. 24, is formed by adhering a first substrate 231a and a second substrate 231b by a sealant (not shown), and sealing a liquid crystal inside the gap, that is, inside a cell gap surrounded by the first substrate 231a, the second substrate 231b and the sealant. Further, a liquid crystal driving IC (not shown) is preferably provided on the surface of one substrate 231b directly, for example, by COG (Chip On Glass) method.

Figure 25:
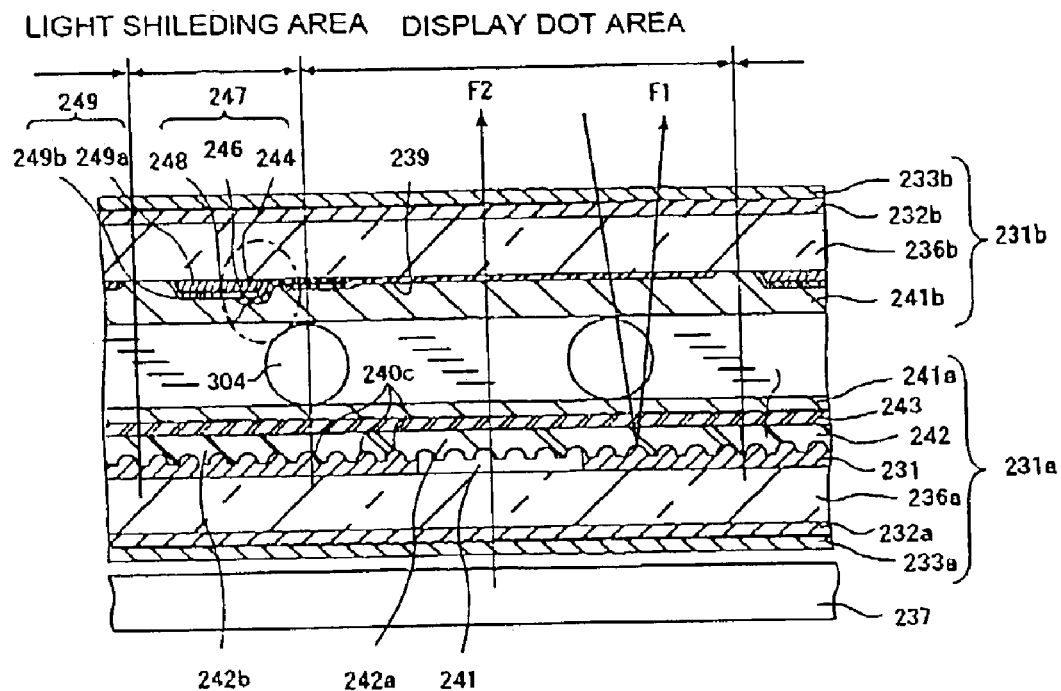
FIG. 25 is a partial sectional view of a TFD-typed liquid crystal display device.
Figure 26:
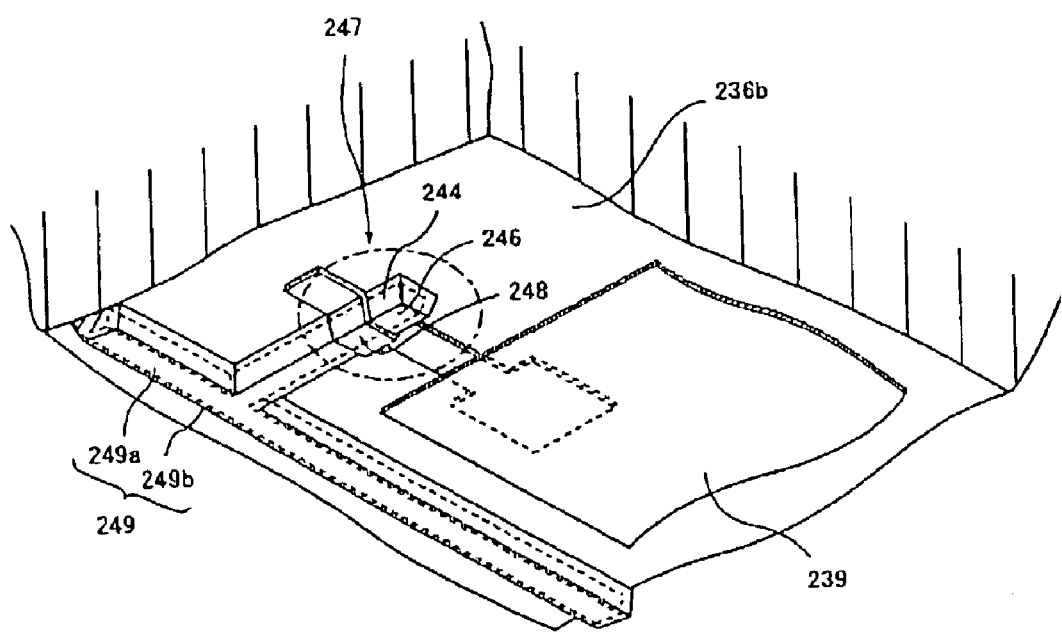
FIG. 26 is a partial perspective view of a TFD-typed liquid crystal display device.
Figure 27:
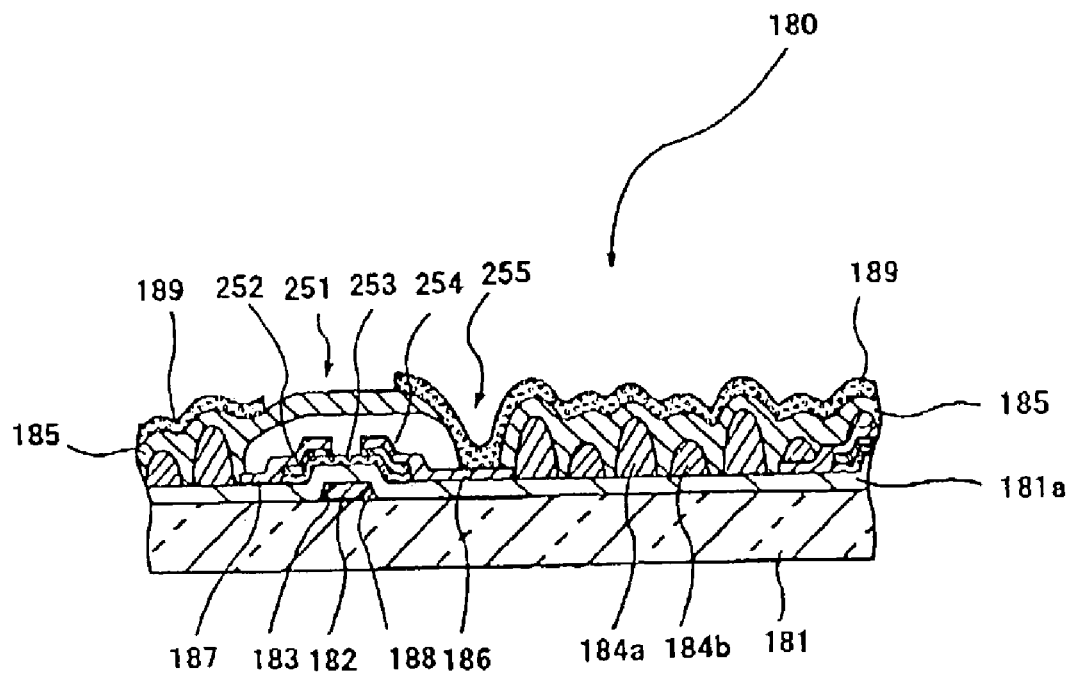
FIG. 27 is sectional view of a structure of a conventional liquid crystal display device.
Figure 28:
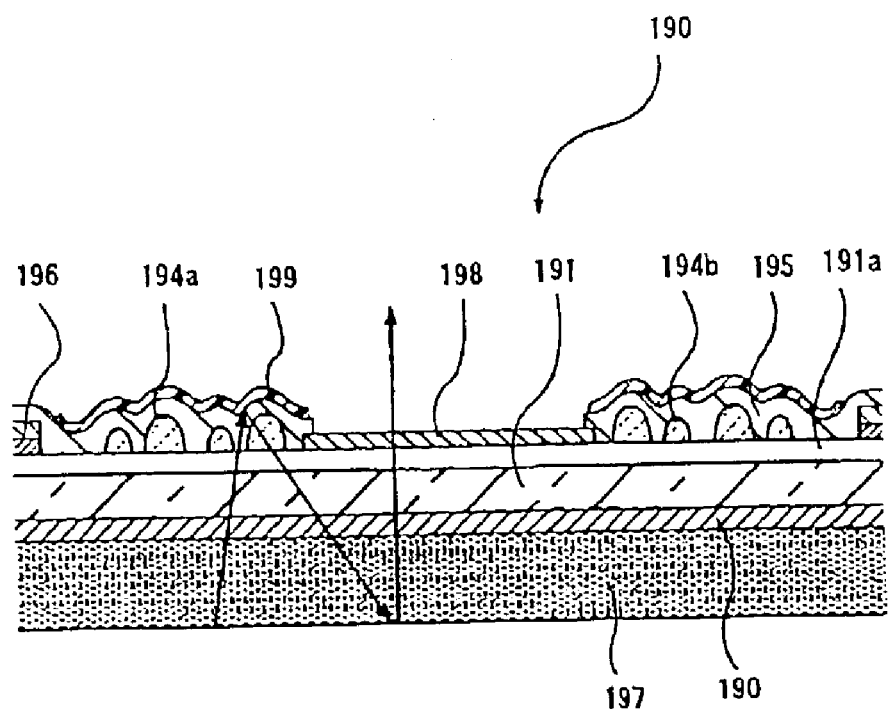
FIG. 28 is a sectional view of another structure of a conventional liquid crystal display device.

Further, FIG. 24 is an enlarged view of several sectional structures of a plurality of display dots forming the display region of the liquid crystal device 230, and FIG. 25 illustrates the sectional structure of one display dot.

Here, as shown in FIG. 24, a plurality of pixel electrodes are aligned on the internal region of the second substrate 231b, surrounded by the sealant with a dot matrix shape relative to row direction (XX) and column direction (YY). Further, stripe-shaped electrodes are provided on the internal region of the first substrate 231a, surrounded by the sealant, and the stripe-shaped electrode is provided to face the plurality of pixel electrodes on the side of the second substrate 231b.

Further, one display dot is formed by the stripe-shaped electrode on the first substrate 231a, one pixel electrode on the second substrate 231b, and liquid crystal interposed therebetween, and a plurality of display dots are aligned on the internal region surrounded by the sealant with a dot matrix-shape so as to form a display region. Further, the liquid crystal driving IC selectively applies a scanning signal and a data signal between the facing electrodes inside the plurality of display dots so as to control the orientation of the liquid crystal every display dot. That is, the light passing through the liquid crystal is modulated by the orientation control of the liquid crystal so as to display images such as characters, number, etc. inside the display region.

Further, in FIG. 25, the first substrate 231a includes a base 236a formed of glass, plastic, etc., a light reflecting film 231 formed on the internal surface of the base 236a, a color filter 242 formed on the light reflecting film 231, and a transparent stripe-shaped electrode 243 formed on the color filter 242. An oriented film 241a is formed on the stripe-shaped electrode 243. A rubbing treatment is performed on the oriented film 241a as an orientation treatment. The stripe-shaped electrode 243 is formed by the material, for example, transparent conductive material such as ITO (Indium Tin Oxide), etc.

Further, the second substrate 231b facing the first substrate 231a includes a material 236b formed of glass, plastic, etc., TFD (Thin Film Diode) 247 formed on the internal surface of the material 236b as an active device and functioning as a switching device, and a pixel electrode 239 connected to the TFD 247. An oriented film 241b is formed on the TFD 247 and the pixel electrode 239, and a rubbing treatment is performed on the oriented film 241b as an orientation treatment. The pixel electrode 239 is formed by the material, for example, transparent conductive material such as ITO (Indium Tin Oxide), etc.

Further, it is preferable that the color filter 242 on the first substrate 231a has one color filter element 242a among the colors of R (red), G (green), B (blue), Y (yellow), M (magenta), C (cyan), etc. on the location facing the pixel electrode 239 of the second substrate 231b, and has a black mask 242b on the location not facing the pixel electrode 239.

Further, as shown in FIG. 25, the gap between the first substrate 231a and the second substrate 231b, that is, the cell gap, maintains its distance by a ball-shaped spacer 304 scattered on the surface of one substrate, and liquid crystal inside the cell gap is sealed.

Here, as shown in FIG. 25, the TFD 247 includes a first metal layer 244, an insulating layer 246 formed on the surface of the first metal layer 244, and a second metal layer 248 formed on the insulating layer 246. TFD 247 is formed by a stacking structure including first metal layer/insulating layer/second metal layer, that is, MIM (Metal Insulator Metal) structure.

Furthermore, for example, the first metal layer 244 is formed by a tantalum element or tantalum alloy, etc. In the case of using tantalum alloy as the first metal layer 244, the elements belonging to the $6^{th}$ to $8^{th}$ groups in the periodic table, that is, tungsten, chrome, molybdenum, rhenium, yttrium, lanthanum, dis-prolium, etc. are added to the tantalum as a main element.

Further, the first metal layer 244 is integrally formed with a first layer 249a of a line circuit 249. The line circuit 249 is shaped like stripes having the pixel electrode 239 therebetween, and functions as a scanning line for supplying a scanning signal to the pixel electrode 239 or as a data line for supplying a data signal to the pixel electrode 239.

Further, the insulating layer 246 is formed by tantalum oxide ($Ta_2O_5$) formed by oxidizing the surface of the first metal layer 244, for example, by an anodic oxidation method. In addition, when anodic-oxidizing the first metal layer 244, the surface of the first layer 249a of the line circuit 249 is also oxidized at the same time so as to form the second layer 249b also made of tantalum oxide.

Further, the second metal layer 248 is formed by a conductive material, for example, Cr, etc. The pixel electrode 239 is formed on the surface of the base 236b such that a part of the pixel electrode 239 is overlapped with the leading end of the second metal layer 248. Further, a base layer can be formed on the surface of the base 236b by tantalum oxide before forming the first metal layer 244 and the first layer 249a of the line circuit. That is intended to prevent the first metal layer 244 from being separated from the bottom by a thermal treatment after the deposited formation of the second metal layer 248, or to prevent impurities from being diffused on the first metal layer 244.

Further, the light reflecting film 231 formed on the first substrate 231a is formed by a light reflective metal, for example, aluminum, etc., and a light transmission opening 241 is formed on the location corresponding to each pixel electrode 239 of the second substrate 231b, that is, the location corresponding to each display dot. For example, a long circular-shaped and dome-shaped down-portion or up-portion 80, 84, 180, 190, 200, 210, 220, as shown in FIG. 8 and FIGS. 19 to 23, are preferably formed on the surface of the liquid crystal side of the light reflecting film 231. Such down-portions or up-portions 80, 84, 180, 190, 200, 210, 220 are preferably aligned such that an X-axis direction as an extended direction of the line circuit is made a major axis, and a Y-axis direction as a perpendicular direction to the X-axis is made a minor axis. The major axis (X) of the down-portions or up-portions 80, 84, 180, 190, 200, 210, 220 is set in parallel with one side of the base extended in the XX direction, and the minor axis (Y) is set in parallel with one side of the base extended in the YY direction.

Since the liquid crystal display device 230 in the fourth embodiment is structured as above, when the liquid crystal display device 230 performs a reflective-typed display, as shown in FIG. 25, the external light from a viewer, that is, the second substrate 231b to the inside of the liquid crystal display device 230 passes through the liquid crystal, reaches the light reflecting film 231, and is reflected from the reflecting film 231 to be supplied to the liquid crystal again (reference to an arrow F1 of FIG. 25). The liquid crystal is controlled on the orientation every display dot by the voltage applied between the pixel electrode 239 and the stripe-shaped facing electrode 243, that is, by scanning signal and data signal, the reflecting light supplied to the liquid crystal is modulated every display dot, and by that, the images of character, number, etc. are displayed on the viewing side.

In the meantime, when the liquid crystal display device 230 performs a transmission-type display, an illuminating device (not shown) provided on the outside of the first substrate 231a, that is, a backlight emits light, and the emitted light passes through a polarizing plate 233a, a phase-difference plate 232a, a base 236a, an opening 241 of the light reflecting film 231, a color filter 242, an electrode 243 and the oriented film 241a so as to be supplied to the liquid crystal (reference to an arrow F2 of FIG. 25). Then, the display is performed as in the case of the reflecting-typed display.

In the substrate with a light reflecting film of the fourth embodiment, the occurrence of interference fringes can be reduced because the positions of the concave portions or convex portions on the base are allocated according to a random function, and the plurality of concave portions or convex portions are aligned randomly over a plane.

Further, in the fourth embodiment, as described above, in the case of differentiating the three-dimensional shape along the X-axis from the three-dimensional shape along the Y-axis in the plurality of concave portions or convex portions, the quantity of reflection light is reduced in the direction of a specific viewing angle, and then, the quantity of reflection light can be increased in the direction of other specific viewing angle. As a result, a viewer can see the display image on the display region of the liquid crystal display device in the reflective display performed by using the light reflecting film, with very high brightness relative to the direction of a specific viewing angle.

Fifth Embodiment

The fifth embodiment illustrates a liquid crystal display device including a liquid crystal interposed between substrates, and a light reflecting film provided on the opposite substrate to the viewing side of the liquid crystal device, the light reflecting film includes a base and a reflecting layer, the positions of a plurality of concave portions or convex portions formed on the base are allocated according to a random function, and the plurality of concave portions or convex portions are aligned randomly over a plane.

Hereinafter, the passive matrix-typed reflective liquid crystal display device is illustrated in detail in the fifth embodiment in reference to FIG. 15. In each figure described below, each layer or each member is illustrated with a size recognizable in the drawing, and therefore, scales can be varied each layer or each member.

1. Structure

As shown in FIG. 15, the liquid crystal display device 140 is structured such that a first substrate 141 and a second substrate 142 facing each other are adhered by a sealant 158, and liquid crystal 144 between the two substrates is sealed. Further, a protective plate 145 having light transmittance is provided on the viewing side of the liquid crystal display device. The protective plate 145 is a member shaped like a plate to protect the liquid crystal display device 140 from the impact, etc. from the outside, and is provided, for example, on the frame member of an electronic apparatus having the liquid crystal display device 140 mounted thereon. Further, the protective plate 145 is provided close to the substrate surface of the first substrate 141 (the substrate of the viewing side) in the liquid crystal display device 140. Further, in this embodiment, the plastic protective plate 145 is adhered on the surface of the polarizing plate 146 located the closest to the viewing side among the component elements of the first substrate 141. As above, if the protective plate 145 is made of plastic, the molding is easy, and manufacturing expenses can be decreased, but fine concave portions or convex portions can be formed on the surface.

In the meantime, the first substrate 141 and the second substrate 142 of the liquid crystal display device 140 are plane-shaped members having light transmittance such as glass, Quartz, plastic, etc. Also, a plurality of transparent electrodes 143, which are extended in a direction, are formed on the surface of the internal side (liquid crystal side 144) of the first substrate 141 on the viewing side. Each transparent electrode 143 is a stripe-shaped electrode formed by a transparent conductive material such as ITO (Indium Tin Oxide), etc. The surface of the first substrate 141 having the transparent electrodes 143 is covered with an oriented film (not shown). The oriented film is an organic thin film of polyimide, etc., and a rubbing treatment is performed to determine the orientation direction of the liquid crystal 144 when voltage is not applied.

2. Light Scattering Film

A polarizing plate 146 for polarizing incident light into a direction is provided on the external side (the opposite side to the liquid crystal 144) of the first substrate 141, and a scattering layer 147 is interposed between the first substrate 141 and the polarizing plate 146. The scattering layer 147 is the layer for scattering the light transmitting the scattering layer 147, and includes an adhesives 148a for adhering the polarizing plate 146 to the first substrate 141, and a plurality of particles 148b scattered on the adhesives 148a. The scattering layer 147 can employ the adhesives 148a of, for example, acryl group or epoxy group, etc. having silica particles 148b scattered thereon. The refractivity of the adhesives 148a and the refractivity of the particles 148b are different, and the light incident on the scattering layer 147 is intended to be refracted on the interface of the adhesives 148a and the particles 148b. As a result, the incident light of the scattering layer 147 can be emitted out properly scattered.

Further, in the scattering layer 147 in the fifth embodiment, the number of the particles 148b scattered on the adhesives 148a or the quantum refractivity, etc. is determined such that the Haze value H is any value within the range of 10 to 60%. The Haze value (H) is a value indicating a scattering degree of the incident light to a member when it penetrates through the corresponding member, and it is defined by following formula.

$$\text{Haze value } H = (Td/Tt) \times 100(\%)$$

Here, Tt is the transmittance (%) of total light, and Td is the transmittance (%) of scattering light. The transmittance of the total light (Tt) is a ratio of the light quantity transmitting a subject to be observed to the light quantity incident on the subject. The transmittance of scattering light (Td) is a ratio of light quantity scattered in a direction other than a specific direction (that is, scattering light quantity) to light quantity transmitting the subject when illuminating light on the subject from the specific direction. That is, supposing that a ratio of the light quantity coming out in the direction parallel with the incident light to the light quantity coming out from the subject is a parallel light transmittance (Tp (%)), the scattering light transmittance (Td) is designated by the difference of total light transmittance (Tt) and parallel light transmittance (Tp) (Td=Tt−Tp). As described as above, if the Haze value (H) is high, the degree of scattering is high (that is, the ratio of scattering light quantity to transmitting light quantity is high.), and on the contrary, if the Haze value (H) is low, the degree of scattering is low (that is, the ratio of scattering light quantity to transmitting light quantity is low.). In addition, the Haze value (H) is described on JIS (Japanese Industrial Standards) K6714-1977.

3. Reflecting Layer (Light Reflecting Film)

In the meantime, a reflecting layer 149 is formed on the internal surface (the side of the liquid crystal 144) of the second substrate 142. The reflecting layer 149 is the layer to reflect the light which is incident from a viewer relative to the liquid crystal display device 140, and is made of the metal having light reflexibility such as, for example, aluminum or silver, etc.

Here, as shown in FIG. 15, the region of the internal surface of the second substrate 142, which is covered by the reflecting layer 149, has a rough surface on which a plurality of fine protrusions and grooves are formed. More specifically, in the light reflecting film including a base and a reflecting layer, the positions of a plurality of concave portions or convex portions formed on the surface of the base are allocated according to a random function, and the reflecting layer 149 is formed by randomly aligning the plurality of concave portions or convex portions over a plane.

For this reason, the reflecting layer 149 has a rough surface, which reflects the protrusions and grooves of the surface of the second substrate 142. That is, the reflecting layer 149 has a scattering structure to realize a broader viewing angle by properly scattering the reflecting light from the surface. More specifically, the reflecting layer 149 is formed on the base including the plurality of concave portions or convex portions, the positions of the plurality of concave portions or convex portions formed on the base are allocated according to a random function, and the plurality of concave portions or convex portions are aligned randomly over a plane.

4. Other Structure

Further, there are formed on the reflecting layer 149 covering the second substrate 142, a color filter 150, a light-shielding layer 151, an overcoat layer 157 for flattening the concave portions or convex portions formed by the color filter 150 and the light-shielding layer 151, a plurality of transparent electrodes 154, and an oriented film (not shown).

Each transparent electrode 154 is a stripe-shaped electrode which is extended crossing (right and left direction on the paper in FIG. 15) with the extended direction of the transparent electrode 143 on the first substrate 141, and it can be made of transparent conductive material such as ITO, etc. as in the transparent electrode 143.

Under this structure, the orientation direction of the liquid crystal 144 is changed according to the voltage applied between the transparent electrode 143 and the transparent electrode 154. That is, the region defined by the transparent electrode 143 and the transparent electrode 154, which cross with each other, functions as a pixel (sub pixel). The color filter 150 is a resin layer provided corresponding to each pixel, and is colored with either one of R, G, B by colorants or dyes.

Further, the light-shielding layer 151 is a lattice-shaped layer for shielding the pitch portion of each pixel, and is formed by, for example, black resin material having carbon black scattered thereon.

5. Operation

The reflective display is realized by the structure described as above. That is, the external light such as sun or indoor illuminating light, etc. transmits the protective plate 145, comes into the liquid crystal display device 140, and is reflected from the surface of the reflecting layer 149.

The reflecting light transmits the liquid crystal 144 and the first substrate 141, and is properly scattered from the scattering layer 147, and transmits the polarizing plate 146, and comes out of the viewing side of the liquid crystal display device 140. The light from the liquid crystal display device 140 transmits the protective plate 145 and is recognizable to the viewer.

Here, as described above, in the case of using plastic as the material of the protective plate 145, it is difficult to make the surface completely flat, and there easily exist a plurality of fine concave portions or convex portions. As above, if providing the protective plate 145 having fine concave portions or convex portions close to the first substrate 141 of the liquid crystal display device 140, the light from the liquid crystal display device 140 occurs interference when it transmits the protective plate 145, and the interference fringes corresponding to the concave portions or convex portions are overlapped with the display images so as to deteriorate the display quality.

However, according to the experiment result by the inventor of the present invention, as described in the embodiment, if scattering the light, which passes through the liquid crystal 144 and reaches the protective plate 145, by the scattering layer 147, the high quality of display images can be achieved.

Further, in the structure of the liquid crystal display device shown in FIG. 15, a high Haze value (H) of the scattering layer 147, that is, high degree of scattering is preferable in the aspect of suppressing the occurrence of interference fringes. However, if the Haze value (H) is too high (for example, a value over 70%), the light reaching the protective plate 145 from the liquid crystal display device 140 is scattered too much so that the contrast of the display image is decreased, that is, the display image is blurred, which is a new problem. In the meantime, if the Haze value (H) is too low, for example, a value less than 10%, the stains due to the concave or convex can be easily found.

As an experiment result by the inventor of the present invention, in the case that a pattern formed by concave portions or convex portions is aligned irregularly inside one unit defined by 1 dot or 2 dots, it is preferable to determine the Haze value (H) of the scattering layer 147 within any value within the range of 40% to 60%, and it is assured that the decrease of the display quality due to the concave or convex on the surface of the protective plate 145 can be effectively prevented while avoiding the remarked decrease of the contrast of display images, and good display quality can be achieved.

Further, in the case that a pattern formed by concave portions or convex portions is aligned irregularly inside one unit defined by over 3 dots, by setting the Haze value (H) of the scattering layer 147 within any value within the range of 10% to 40%, the contrast can be made high.

Further, as described in the fifth embodiment, in the case of using the scattering layer 147 formed by scattering particles 148b on the adhesives 148a, the Haze value (H) can be arbitrarily determined, for example, by controlling the added amount (number) of the particles 148b.

That is, in the case of increasing the added amount of the particles 148b scattered on the adhesives 148a, since the incident light to the scattering layer 147 is scattered more than ever, the Haze value (H) of the scattering layer 147 can be increased, and on the contrary, in the case of decreasing the added amount of the particles, the Haze value (H) of the scattering layer 147 can be decreased.

Further, according to the fifth embodiment, it is advantageous to easily select the scattering degree of the light coming from the liquid crystal display device 140 over the wide ranges. That is, in the liquid crystal display device 140 having no scattering layer 147, it is necessary to control the shape of the surface of the reflecting layer 149, for example, the height of the concave portion or the depth of the convex portion, or the pitch between adjacent concave portions (or convex portions) in order to control the scattering degree of the light coming from the liquid crystal display device 140.

However, it is not always easy to make the surface of the reflecting layer 149 the shape as desired, considering the manufacturing conditions of forming the concave portions or convex portions on the second substrate 142. In addition, the controllable scattering range of the light coming from the liquid crystal display device 140 is limited to a very narrow range only by controlling the shape of the surface of the reflecting layer 149.

According to the embodiment, even without substantially changing the shape of the surface of the reflecting layer 149, the scattering degree of the light coming from the liquid crystal display device 140 can be easily controlled over the wide range by changing the Haze value (H) of the scattering layer 147, for example, by properly controlling the added amount of the particles 148b scattered on the adhesives 148a, etc.

Sixth Embodiment

The sixth embodiment illustrates a liquid crystal display device including a liquid crystal interposed between substrates and a light reflecting film provided on the substrate opposite to a viewing side of the liquid crystal device, the light reflecting film includes a base and a reflecting layer, and the liquid crystal display device is a passive matrix-typed semi-transmission and reflection type liquid crystal display device, in which the positions of a plurality of concave portions or convex portions are allocated according to a random function, and the plurality of concave portions or convex portions are aligned randomly over a plane.

Then, the passive matrix-typed semi-transmission and reflection type liquid crystal display device according to the sixth embodiment is illustrated in detail in reference to FIG. 16.

1. A Basic Structure

As shown in FIG. 16, a backlight unit 153 is provided on the back side (the opposite side to a viewing side) of a liquid crystal display device 160. The backlight unit 153 includes a plurality of LEDs 15 (only one LED 15 is illustrated in FIG. 16.) as a light source, a light guide plate 152 for guiding the light incident to the lateral end of the LED 15 to the overall surface of the second substrate 142 of the liquid crystal display device 160, a diffusion plate 155 for uniformly diffusing the light guided by the light guide plate 152 relative to the liquid crystal display device 160, and a reflecting plate 156 for reflecting the light coming from the light guide plate 152 to the opposite side to the liquid crystal display device 160, toward the liquid crystal display device 160.

Here, the LED 15 is not turned on all time, and in the case of using under the environment with little external light, it can be turned on according to the direction from a user or a detection signal from a sensor.

Further, the liquid crystal display device 160 of the sixth embodiment has an opening 159 formed on the region corresponding to around the central region of each pixel on the reflecting layer 149. In addition, a pair of polarizing plates are adhered on the external side (the opposite side to the liquid crystal 144) of the second substrate 142, and the polarizing plate is not illustrated in FIG. 16.

2. Operation

According to the liquid crystal display device 160 structured as above, a transmission-typed display can be realized along with the reflective-typed display in the fifth embodiment. That is, the light irradiated from the backlight unit 153 on the liquid crystal display device 160 passes through the opening 159 of the reflecting layer 149. The light transmits the liquid crystal 144 and the first substrate 141, is scattered from the scattering layer 147, transmits the polarizing plate 146, and is emitted to the viewing side of the liquid crystal display device 160. Then, the transmission-typed display is realized when the emitted light transmits the protective plate 145 and is emitted to the viewing side.

Therefore, in the embodiment, as in the fifth embodiment, even if the protective plate 145 having fine concave portions or convex portions on the surface is provided close to the liquid crystal display device 160, the decrease of the display quality due to the concave or convex can be suppressed.

Seventh Embodiment

A seventh embodiment illustrates one modified example of a liquid crystal display device including a liquid crystal device interposed between the substrates, and a light reflecting film provided on the substrate opposite to a viewing side of the crystal display device, the light reflecting film is formed of a base and a reflecting layer, the positions of a plurality of concave portions or convex portions are allocated by a random function, and the plurality of concave portions or convex portions are aligned randomly over a plane.

(1) First Modification

In each embodiment as above, a scattering layer 147 is formed between a first substrate 141 and a polarizing plate 146, but the location of the scattering layer 147 is not limited to that. For example, in the case of providing a phase difference plate between the polarizing plate 146 and the first substrate 141 to compensate an interference color, the scattering layer 147 can be interposed between the phase difference plate and the first substrate 141, or can be interposed between the phase difference plate and the polarizing plate 146. That is, the structure is enough only if the scattering plate 147 is provided on the side of a protective plate 145 relative to the liquid crystal 144.

Further, in each embodiment as above, there is used the scattering layer 147 having a structure of scattering a plurality of particles 148b on an adhesives 148a, but the structure of the scattering layer 147 is not limited to this, and therefore, only if it is a layer being capable of scattering an incident light, any structure is sufficient. However, in the case of using the scattering layer 147 including the adhesives 148a, since the gap between the members interposing the scattering layer 147 (the fist substrate 141 and the polarizing plate 146 in each embodiment) can be adhered by the adhesives 148a, the reduction of manufacturing cost and the simplification of manufacturing processes can be advantageous compared with the case of using the scattering layer 147 without the adhesives 148a.

(2) Second Modification

The fifth embodiment illustrates a reflective liquid crystal display device and the sixth embodiment illustrates a semi-transmission and reflection type liquid crystal display device, but the present invention can be employed on a backlit liquid crystal display device for performing a backlit display only without the reflecting layer 149. That is, in the backlit liquid crystal display device, it is sufficient with a structure by removing the reflecting layer 149 in the semi-transmission and reflection type liquid crystal display device shown in FIG. 16.

In the fourth embodiment, it is structured such that both of a reflective display and a backlit display are realized by the reflecting layer 149 having the opening 159, but it is apparent that the present invention can be employed on a semi-transmission and reflection type liquid crystal display device using, instead of the reflecting layer 149, so-called a half mirror transmitting a part of irradiated light and reflecting the other part of it.

(3) Third Modification

In each of the above embodiments, the case of using a plastic-plate shaped member as a protective plate 145 is illustrated. Since concave or convex can be easily formed on the surface of the protective plate 145, an excellent effect can be achieved by employing this invention. However, the material of the protective plate 145 is not limited to this, but a plate-shaped member made of various kinds of material other than the above can be used as the protective plate 145.

(4) Fourth Modification

In each of the above embodiments, the case of forming the color filter 150 or the light-shielding layer 151 on the second substrate 142 is illustrated, and it is apparent that the present invention can be employed on a liquid crystal display device having such an element formed on the first substrate 141, or on a liquid crystal display device having no color filter 150 or no light-shielding layer 151 formed thereon. As above, the present invention can be employed on the liquid crystal display device 160 having the protective plate 145 provided close to a viewing side, regardless of the states of the other components.

(5) Fifth Modification

In the fourth embodiment, there is illustrated an active matrix-typed liquid crystal display device using two-terminal active device, TFD, and as shown in FIG. 13, it is possible to provide an active matrix-typed liquid crystal display device using three-terminal active device, TFT. In this case, as shown in FIG. 13, it is preferable to provide the TFT device on the light-shielding region.

Eighth Embodiment

The eighth embodiment illustrates an electronic apparatus including a liquid crystal display device having a light reflecting film, which is characterized in that the light reflecting film includes the base and the reflecting layer, and a plurality of concave portions or convex portions are aligned randomly over a plane by a random function.

(1) Mobile Computer

Figure 17:
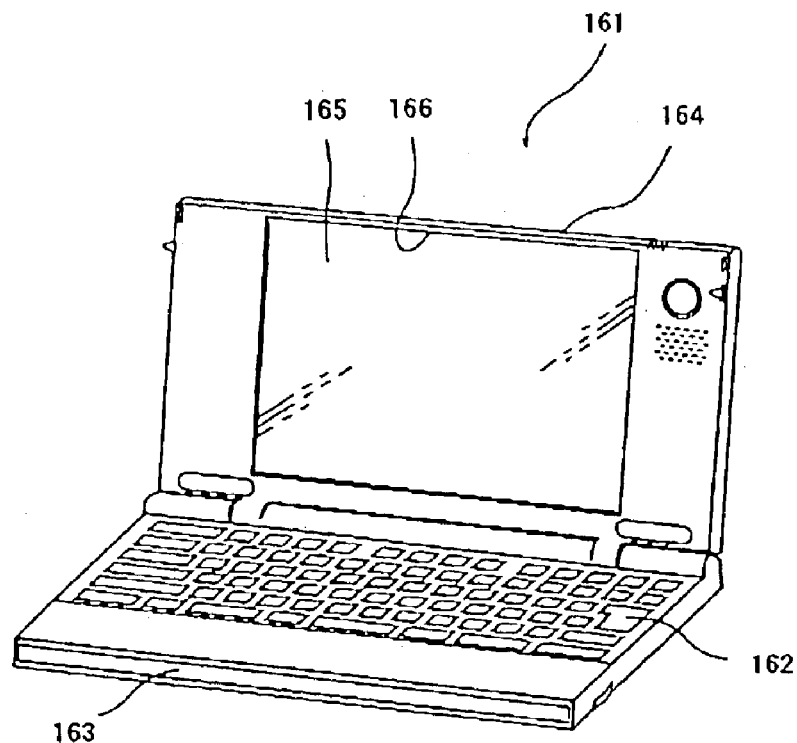
FIG. 17 is a perspective view of a personal computer as one example of an electronic apparatus.

First, there is explained an example of the liquid crystal display device related to the present invention, which is employed on a display unit of a portable personal computer (so called, notebook personal computer). FIG. 17 is a perspective view to illustrate the structure of the personal computer. As shown in the drawing, the personal computer 161 includes a body unit 163 having a key board 162, and a display unit 164 using the liquid crystal display device (not shown) related to the present invention. The display unit 164 is configured such that a liquid crystal display device 160 related to the present invention is received by a frame member 166 including a plastic protective plate 145 corresponding to a window unit 165. More specifically, the liquid crystal display device 160 is received by the frame member 166 such that the substrate surface of the viewing side is close to the protective plate 145. In addition, in the personal computer 161, it is preferable to employ a semi-transmission and reflection type liquid crystal display device having a backlight unit 153 on the back side as shown in the sixth embodiment, in order to assure the viewing of the display even in the case where enough external light does not exist.

(2) Mobile Phone

Figure 18:
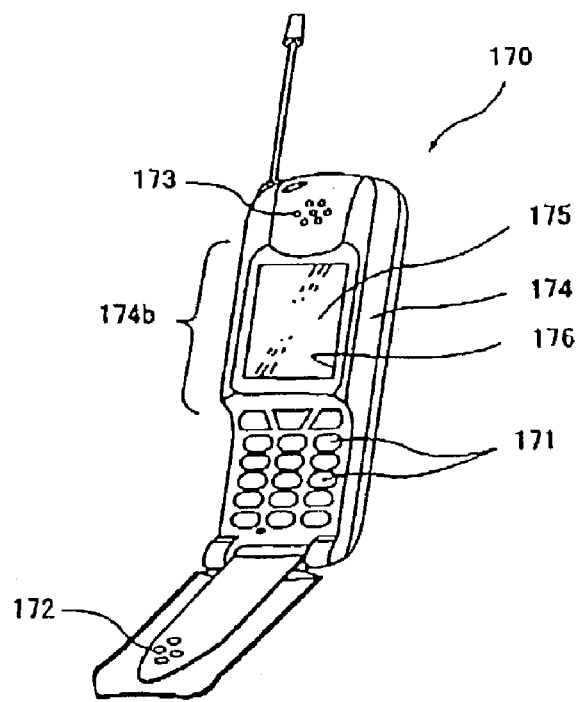
FIG. 18 is a perspective view of a mobile phone as one example of an electronic apparatus.
Figure 19:
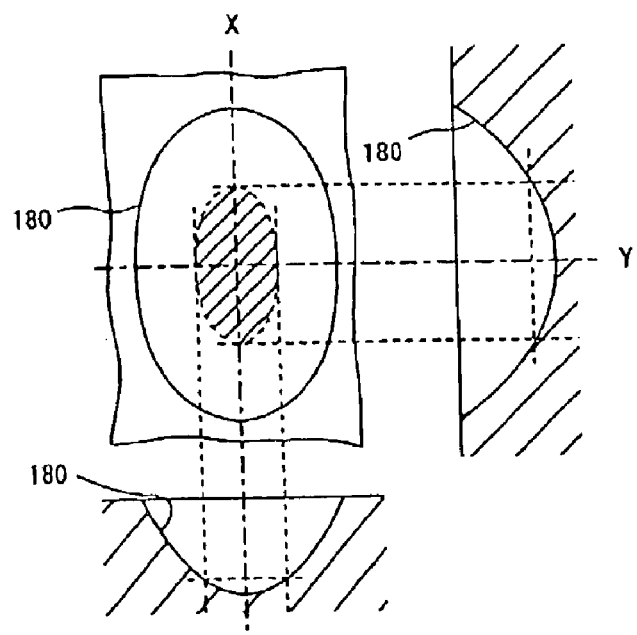
FIG. 19 is a plan view and a sectional view of a substrate with a light reflecting film formed of an actually cone-shaped concave portion.
Figure 20:
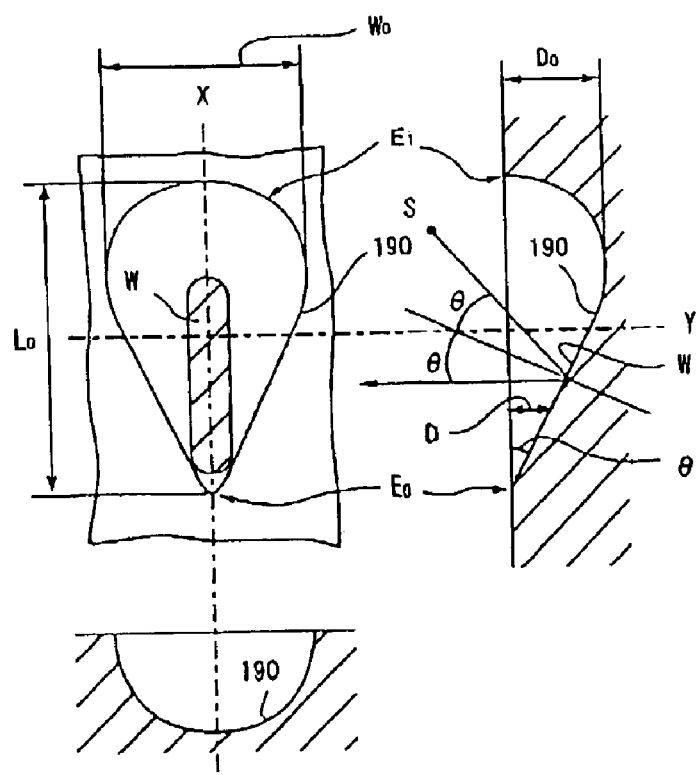
FIG. 20 is a plan view and a sectional view of a substrate with a light reflecting film formed of an asymmetric actually teardrop-shaped concave portion.
Figure 21:
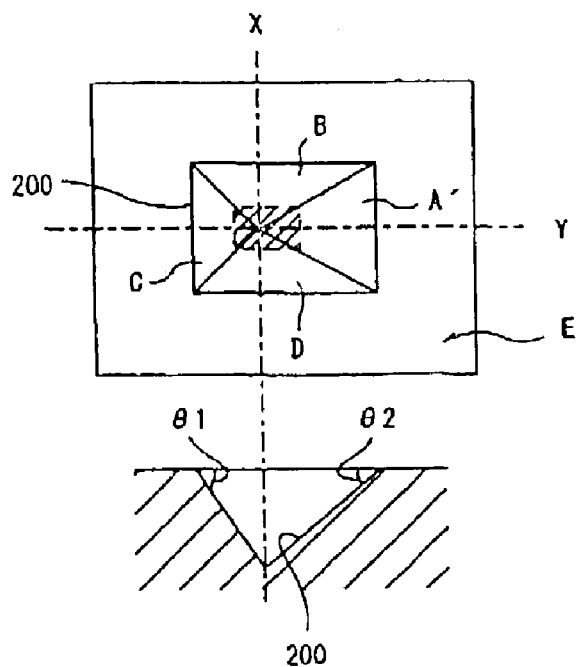
FIG. 21 is a plan view and a sectional view of a substrate with a light reflecting film formed of an asymmetric actually pyramid-shaped concave portion.
Figure 22:
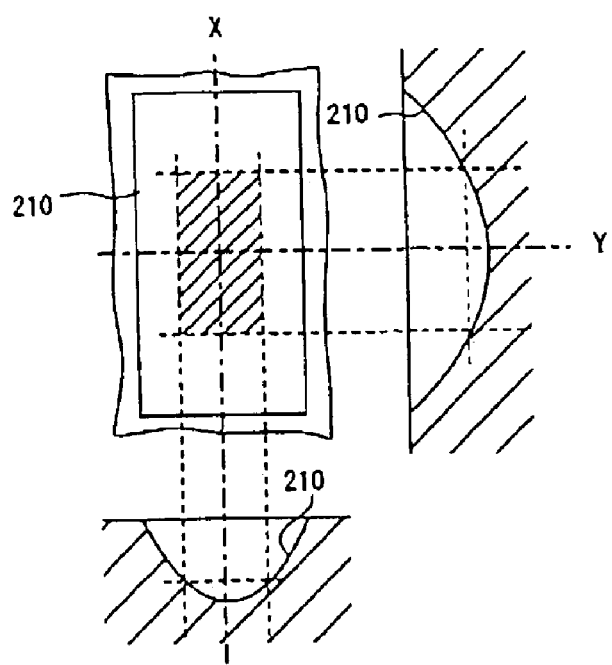
FIG. 22 is a plan view and a sectional view of a substrate with a light reflecting film formed such that its planar section is substantially shaped like a parabola having a small radius of curvature and its vertical section is shaped like a concave part of the parabola having the radius of curvature greater than the former one.
Figure 23:
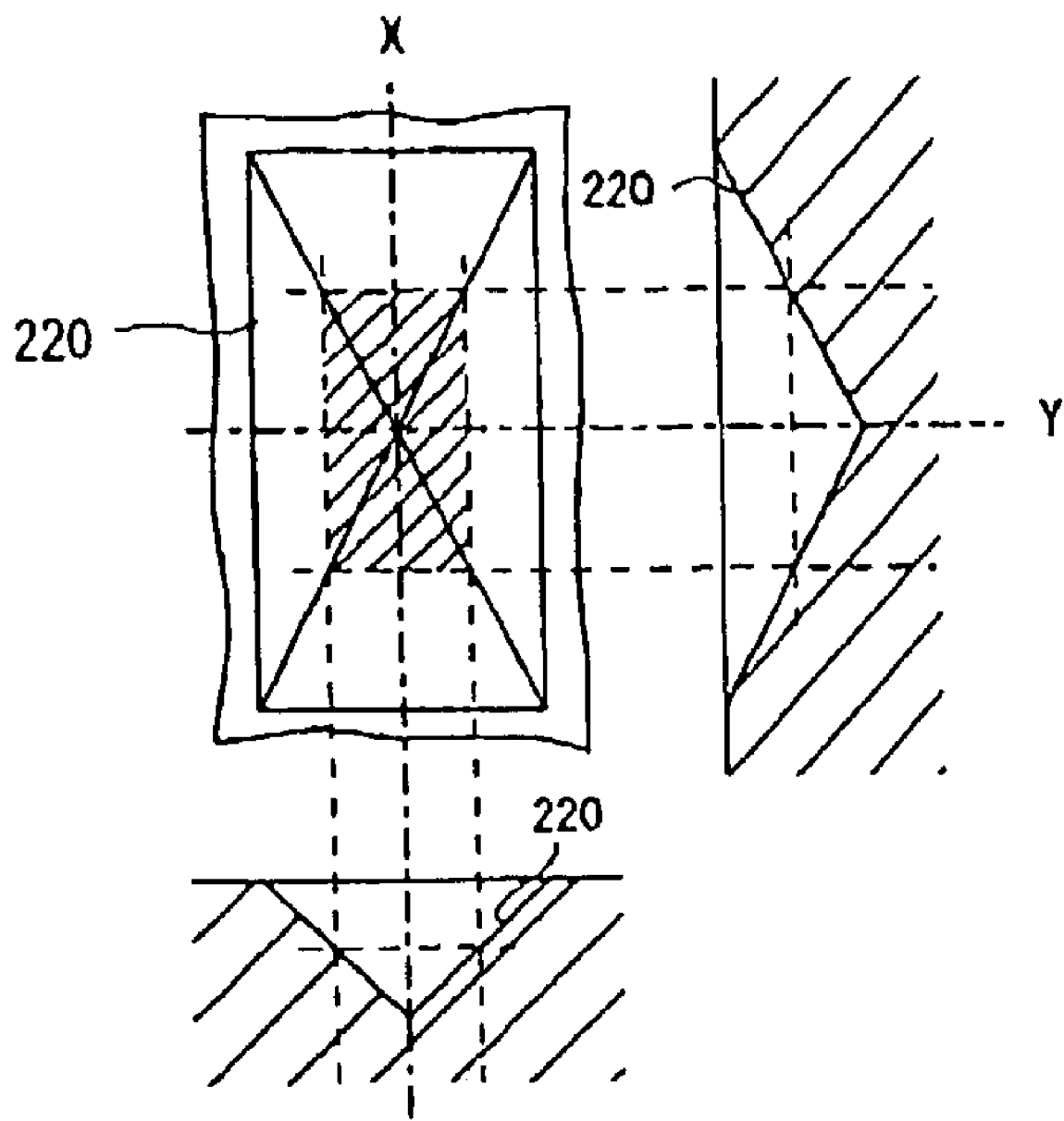
FIG. 23 is a plan view and a sectional view of a substrate with a light reflecting film formed such that its planar section is substantially a rectangle and its vertical section is shaped like a concave part of a pyramid shape.

Next, there is explained an example of employing the liquid crystal display device related to the present invention on a display unit of the mobile phone. FIG. 18 is a perspective view to illustrate a structure of the mobile phone. As shown in the drawing, the mobile phone 170 includes a plurality of control buttons 171, a receiver 172, a microphone 173, and a display unit 174 employing the liquid crystal display device (not shown) related to the invention. In the mobile phone 170, the liquid crystal display device related to the invention is received by a frame member 176 including a plastic protective plate 175 corresponding to a window unit 174b. In addition, in the mobile phone 170, the liquid crystal display device is received by the frame member 176 such that the substrate surface of the viewing side is provided close to the protective plate 175 as in the personal computer.

In addition, as an electronic apparatus employing the liquid crystal display device related to the present invention, there are a liquid crystal television, a view finder type monitor direct view type video tape recorder, a car navigation device, a pager, an electronic notebook, a calculator, a word processor, a work station, a visual telephone, a POS terminal, the devices including a touch panel, or the like besides the personal computer in FIG. 17 and the mobile phone in FIG. 18.

As described above, according to the liquid crystal display device related to the present invention, even with a protective plate having fine concave portions or convex portions on the surface, provided close to the substrate surface of the liquid crystal display device, the decrease of the display quality due to the concave or convex can be suppressed. Therefore, without the decrease of the display quality, the flat-size or miniaturization of electronic apparatus can be achieved by providing the protective plate close to the liquid crystal display device.

EFFECTS OF THE INVENTION

As described above, the mask of the present invention and the light reflecting film achieved therefrom can be easily manufactured by using a random function, and as a result, a smooth reflecting layer is formed on a base having a plurality of concave portions or convex portions, and when used on a liquid crystal display device, etc., the occurrence of interference fringes can be effectively suppressed. According to the mask of the present invention, a mask pattern for providing a light reflecting film to generate few interference fringes can be easily and rapidly designed on a large-sized liquid crystal display device, etc. as well as a small-sized liquid crystal display device, etc.

According to the liquid crystal display device having the light reflecting film of the present invention provided therein and the electronic apparatus having the light reflecting film, the occurrence of interference fringes is decreased, and the design and manufacturing become simple and easy. According to the liquid crystal display device having the light reflecting film of the present invention provided therein and the electronic apparatus having the light reflecting film, irregular stains, which occur in the case of the random pattern of a plurality of concave portions or convex portions on the light reflecting film, can be effectively suppressed by using a light scattering film or performing a specific design allocation.

According to the liquid crystal display device having the light reflecting film of the present invention provided therein and the electronic apparatus having the light reflecting film, even in the case of providing a protective plate having fine concave portions or convex portions on the surface close thereto, the decrease of the display quality due to the concave or convex can be suppressed.

The substrate with a light reflecting film, the electric optical device and the electronic apparatus of the present invention can be very appropriately employed on a device, etc. using an electrophoresis besides the liquid crystal display device, etc. described in the embodiments.

The entire disclosure of Japanese Patent Application No. 2002-108528 filed Apr. 10, 2002 is incorporated by reference.

What is claimed is:

1. A mask for manufacturing a substrate with a light reflecting film, the mask comprising:
light-transmitting parts and non-light transmitting parts, wherein positions of light-transmitting parts or non-light-transmitting parts are allocated according to a random function, and the tight-transmitting parts or non-light-transmitting parts are aligned randomly over a plane;
wherein the light-transmitting parts or non-light-transmitting parts are formed with a stripe-shaped random pattern in a horizontal direction or in a longitudinal direction, and the stripe-shaped random pattern is repeated in a plurality of rows.

2. The mask according to claim 1, wherein the light-transmitting parts or non-light-transmitting parts are aligned randomly over a plane by generating a number between 0 and 1 by the random function, allocating any number of 1 to n (n is a natural number from 2 to 1000) to all dots based on the number generated by the random function, and associating n types of random patterns prepared in advance to the allocated numbers.

3. The mask according to claim 1, wherein light-transmitting parts or non-light-transmitting parts are aligned randomly over a plane with one unit of 100 to 2,000 dots.

4. The mask according to claim 1, wherein a diameter of the light-transmitting parts or non-light-transmitting parts is any value within the range of 3 to 15 $\mu$m.

5. The mask according to claim 1, wherein 2 to 10 types of light-transmitting parts or non-light-transmitting parts having different diameters, are provided.

6. A mask according to claim 1, wherein one of the light-transmitting parts and non-light transmitting parts is formed in a hexagon pattern.

7. A substrate with a light reflecting film comprising:
a base; and
a reflecting layer on the base, wherein positions of a plurality of concave portions or convex portions formed on the base are allocated according to a random function, and the concave portions or convex portions are aligned randomly over a plane;
wherein the plurality of concave portions or convex portions are formed with a stripe-shaped random pattern in a horizontal direction or in a longitudinal direction, and the stripe-shaped random pattern is repeated in a plurality of rows.

8. The substrate with a light reflecting film according to claim 7, wherein the plurality of concave portions or convex portions are aligned randomly over a plane with one unit of 100 to 2,000 dots.

9. The substrate with a light reflecting film according to claim 7, wherein a diameter of the plurality of concave portions or convex portions is any value within the range of 3 to 15 $\mu$m.

10. The substrate with a light reflecting film according to claim 7, wherein 2 to 10 types of concave portions or convex portions having different diameters are provided.

11. The substrate with a light reflecting film according to claim 7, wherein the base includes a first base and a second base formed over the first base, the first base includes a plurality of concave portions or convex portions, and the second base includes a plurality of continuous concave portions or convex portions.

12. A substrate according to claim 7, wherein each one of said concave portion or said convex portion has a hexagon pattern.

13. A method of manufacturing a light reflecting film including a base and a reflecting layer, the method comprising the steps of:
forming a first base having a plurality of concave portions or convex portions aligned randomly over a plane by exposing a coated photosensitive resin by using a mask in which positions of light-transmitting parts or non-light-transmitting parts are allocated according to a random function, and the light-transmitting parts or non-light-transmitting parts are aligned randomly over a plane, the plurality of concave portions or convex portions formed with a stripe-shaped random pattern in a horizontal direction or a longitudinal direction, the stripe-shaped random pattern repeated in a plurality of rows;
forming a second base having a plurality of continuous concave portions or convex portions by coating the first base with a photosensitive resin and exposing it; and
forming the reflecting layer on the second base.

14. An optical display device comprising:

an optical device interposed between substrates; and a light reflecting film provided on one of substrates opposite to the viewing side of the optical device, wherein the light reflecting film includes a base and a reflecting layer, and a plurality of concave portions or convex portions are formed on the base at positions allocated according to a random function, and the plurality of concave portions or convex portions are aligned randomly over a plane, the plurality of concave portions or convex portions are formed in a longitudinal direction and the stripe-shaped random pattern is repeated in a plurality of rows.

15. The optical display device according to claim 14, wherein a protective plate is provided on a viewing side of the optical display device.

16. An optical display device according to claim 14, wherein the light reflecting film includes light transmissive portions and light non-transmissive portions.

17. An optical display device according to claim 14, further comprising an element for driving the optical device, the element and the light reflecting film being on opposite sides of the optical device.

18. An electronic apparatus comprising an optical display device including a light reflecting film, wherein the light reflecting film comprises a base and a reflecting layer, the positions of a plurality of concave portions or convex portions formed on the base are allocated according to a random function, and the plurality of concave portions or convex portions are aligned randomly over a plane, the plurality of concave portions or convex portions are formed with a stripe-shaped random pattern in a horizontal direction or in a longitudinal direction and the stripe-shaped random pattern is repeated in a plurality of rows.

19. An electronic apparatus according to claim 18, wherein the light reflecting film includes light transmissive portions and light non-transmissive portions.

20. An electronic apparatus according to claim 18, further comprising an element for driving the optical device, the element and the light reflecting film positioned on opposite sides of the optical device.

* * * * *